United States Patent [19]
Sherwood et al.

[11] Patent Number: 6,003,469
[45] Date of Patent: Dec. 21, 1999

[54] PROCESS FOR THE CONTROL OF PESTS

[75] Inventors: Nicholas Sydney Sherwood, The Oaks; Timothy James Watts, Brighton East, both of Australia

[73] Assignee: Nufarm Limited, Australia

[21] Appl. No.: 09/052,394

[22] Filed: Mar. 31, 1998

[51] Int. Cl.[6] ................................................ A01K 13/00
[52] U.S. Cl. .............................................................. 119/673
[58] Field of Search .................................... 119/650, 651, 119/673, 174; 424/195.1, 676, 680

[56] References Cited

U.S. PATENT DOCUMENTS

| | | | |
|---|---|---|---|
| 4,183,329 | 1/1980 | Leonaggeo, Jr. ........................ | 119/651 |
| 4,195,075 | 3/1980 | Miller ................................... | 119/651 X |
| 4,212,897 | 7/1980 | Young et al. ........................ | 119/651 X |
| 5,456,913 | 10/1995 | Miller, Jr. ............................. | 119/651 |
| 5,769,029 | 6/1998 | Marshall ................................. | 119/651 |

Primary Examiner—Thomas Price
Attorney, Agent, or Firm—Wolf, Greenfield & Sacks, P.C.

[57] ABSTRACT

The invention provides a method of dipping a number of animals of a species with a pesticide using a formulation of the pesticide which is subject to stripping of the pesticide during dipping of successive animals or groups of animals, the method including:

establishing a predetermined level of a dipping liquid containing a first concentration of the pesticide ($C_{IC}$) in a dipping vessel the concentration providing safe and effective pesticidal treatment;

dipping the animals in the dipping liquid; and maintaining the predetermined level of the dipping liquid in the dipping vessel by addition thereto of a replenishment composition containing a second concentration of the pesticide the second concentration of the pesticide ($C_{CR}$) being greater than the first concentration of the pesticide, to thereby maintain a safe and pesticidally effective concentration of the pesticide.

16 Claims, 14 Drawing Sheets

PROCESS FOR THE CONTROL OF PESTS

FIELD

This invention relates to the application of pesticides to animals particularly to sheep, cattle, goats and other cloven hoofed animals. More particularly, the invention relates to a dipping method in which the dip level is continuously replenished during the treatment of animals.

BACKGROUND AND PRIOR ART

The process for controlling pests, particularly ectoparasites in sheep and cattle by dipping has been in use for many years. Dipping is an inexpensive method for the control of a wide range of pests, including ectoparasites of the classes Insecta and Arachnida, and particularly including *Lucilia cuprina* and *Lucilia sericata* responsible for blowfly strike of sheep; *Bovicola ovis* (Sheep body (biting) louse) infestation of sheep; *Psorergates ovis* (itchmite) infestation of sheep; *Psoroptes ovis* (sheep scab mite) infestation of sheep; *Melophagus ovinus* (Sheep ked) infestation of sheep; *Damalinia caprae* (goat body (biting) louse) infestation of goats; *Boophilus microplus* (Cattle tick), *Haemaphysalis* spp. (Bush ticks), *Rhipicephalus evertsi* and *Aponomna* spp (red legged ticks), *Rhipicephalus appendiculatus* (brown ear tick) *Hyalomma* spp (Bont-legged tick) and *Ambylomma* spp. (Bont tick) infestation of bovid animals; *Damalinia bovis* (biting louse), *Haematopinus eurysternus* (short-nosed sucking louse), *Haematopinus tuberculatus* (buffalo louse), *Haematopinus quadripertusus* (tail switch louse), *Linognathus vituli* (long-nosed sucking louse) and *Solenopotes capillatus* (little blue sucking louse) infestations of cattle; *Chorioptes bovis* (Scrotal mange mite) infestation of cattle and sheep; *Haematobia irritans exigua* (Buffalo fly, Horn fly) annoyance of bovids; *Hypoderma bovis* (Warble fly) infestation of bovids; *Glossina* sp. (Tsetse fly) carrying sleeping sickness, a disease of economic importance principally in cattle; *Chrysomya* spp. (screw worm flies) of many livestock species; *Musca* spp. and *Stomoxys calcitrans* (Stable fly) which cause annoyance of mainly housed or intensively managed livestock.

Two types of dipping methods are commonly used, namely plunge dipping and shower dipping (which is also referred to as spray dipping). In plunge dipping the animals are fully immersed in dipping liquid contained in the dip or sump (vessel holding liquid). In shower or spray dipping a pump draws liquid from a sump (vessel holding liquid) and delivers the liquid via pipes to nozzles which spray the animals. Excess liquid returns to the sump via floor drains.

In the plunge dipping method, animals leaving the dip retain some of the dipping liquid in or on their exterior. This liquid may be carried away from the dip, causing a loss of dipping liquid from the dip. This loss of liquid is generally proportional to the number of animals which have passed through the dip.

In the shower dipping method, batches of animals (in the case of sheep, typically 25–70 animals/batch) are herded into a dipping station and are sprayed with the dipping liquid for a time period specified to adequately wet the animals. The liquid level in the sump of the shower dipping station initially drops rapidly as liquid is directed to the shower nozzles, however drains are generally provided to return liquid from the floor of the dipping station to allow its recycling. Some of the dipping liquid is retained in or on the surface of the animals and as a result the total dipping liquid is continually reduced. When the showering operation is completed, the animals leave the dipping station and the dipping liquid returns via the floor drains, resulting in a rapid rise in the liquid level in the sump. For smaller sumps, where the volume of dipping liquid in the return lines is a significant fraction of the total sump volume, the difference between sump level during and after dipping is proportionally greater. As referred to above, however there is also a net loss of dipping liquid from the sump between beginning and end of each batch treatment, and this net loss is directly proportional to the number of animals which have passed through the station.

The quantity of dipping liquid which is lost during plunge and spray dipping must be replaced when significant numbers of animals are to be treated. Replacement methods can be characterised either as intermittent or continuous. Intermittent replacement methods are characterised by replacement of dipping liquid in the sump only at discrete time points (between these discrete time points no replacement of dipping liquid occurs). In practice, intermittent replacement methods can involve:

periodic topping up of liquid in the sump (for both plunge and shower dipping stations). This is undertaken when some fixed portion, preferably no greater than 25%, of the sump volume has been expended, or batch-by-batch topping up of liquid in the sump (for both plunge and shower dipping stations). This is undertaken after each batch of animals has left the dipping station.

Continuous replacement methods are those wherein replacement liquid is available for progressive addition to the sump at all or most times throughout the dipping process. Replacement is usually achieved by the transfer of dipping liquid from a holding tank or vessel to the sump. It is important to note that in continuous replacement methods, the rate of addition of dipping liquid from the holding tank to the sump need not be steady, but may be adjusted in response to rate of loss of dipping liquid from the sump.

Hereinafter, the practice or method of periodic topping up or replacement of dipping liquid in the sumps of plunge or shower dipping stations will be denoted as periodic replenishment. Similarly, batch-by-batch topping up or replacement will be denoted batch replenishment and continuous topping up or replacement will be denoted continuous replenishment.

In replenishment methods, the quantity of dipping liquid in the sump of the dipping station is regulated either by:
a) maintaining its height at some predetermined level, or
b) maintaining its height within a range which is fixed by predetermined lower and upper levels.

For periodic replenishment plunge dips, the level of dipping liquid in the sump of the dipping station gradually declines from its maximum to its minimum predetermined level (eg. 75% of maximum). For periodic replenishment of shower dips, the level of dipping liquid in the sump of the dipping station when measured at immediately before the start of each batch gradually declines from its maximum to its minimum predetermined level (eg. 75% of maximum). For batch replenishment plunge dips, the level of dipping liquid in the sump of the dipping station gradually declines as animals of the batch pass through the dipping station. For batch replenished shower dips, the level of dipping liquid in the sump of the dipping station when measured at the conclusion of each batch is somewhat less than the level of dipping liquid in the sump when measured immediately before the start of each spray batch. For continuously replenished plunge dips, the level of dipping liquid in the sump remains steady at a single predetermined level (minor variations of less than 10% may occur in practice). For continuous replenishment shower dips, the level of dipping liquid in the sump immediately before the start of spraying of a given batch is the same as the level in the sump immediately before the start of spraying of the next batch (again minor variations of less than 10% may occur in practice).

A significant problem in the dipping process is stripping. Stripping is a process whereby animals preferentially remove the active (pesticidal) ingredient in the dipping liquid relative to the volume of dipping fluid removed. Stripping may lead to a number of undesirable consequences.

As a result of stripping the concentration of active ingredient in the sump decreases as increasing numbers of animals pass through the sump.

The latter portion of animals passing through the dipping station commonly obtain an undesirably low dose of active ingredient, leading to insufficient protection against pest species. The retention of pest activity on even a few dipped animals can lead to the rapid reinfestation of the entire group of animals increasing the risk to the health of the entire animal population. Additionally, exposure of pests to sublethal doses of pesticide can foster development of pesticide resistance.

The reduced dose received by latter animals can be offset by increasing the concentration of active ingredient in the initial dip, however this has the undesirable consequence that the first animals through the dipping station may obtain an undesirably high dose, leading to problems of pesticide contamination of animal products such as wool and meat. In wool processing, the accumulation of pesticide in lanolin may lead to effluent disposal problems following scouring of the fleece. Toxic effects for animals exposed to high pesticide doses are also possible.

As a consequence of removal of dipping liquid by animals passing through the dipping station and preferential removal of active ingredient in the stripping process, the problem of applying a uniform dose to all animals passing through the dipping station is complex.

British Patent 2,186,474 discloses a process in which a special dosing device dispenses concentrated active ingredient in proportion to the number of animals passing through the dipping sump (countering the effect of stripping) and the fluid level in the sump of the dipping station is also maintained by addition of diluent which is substantially water. An important component of the method of Stratford et al is the use of a sheep counting device to enable the correct dose of concentrated active ingredient to be applied to the sump. The method of Stratford et al is theoretically capable of providing a uniform dose of pesticide to all animals passing through the dipping station however the method has not been accepted by farmers. This is presumably because of the cost, complexity and inconvenience of installing, maintaining and calibrating the device for dispensing active ingredient in response to animal number. The requirement for calibration of this device is particularly inconvenient since the same active ingredient may strip at different rates in different use contexts.

Another approach to overcoming the problem of stripping of active ingredient in a dipping operation is to change the formulation of active ingredient. It has been noted that microencapsulation of the active ingredient overcomes the stripping problem (Ciba Geigy patent AU-B-80034/87) and it has also been found that changing the solvent carrier in a formulation of active ingredient can reduce the propensity of the pesticide on to undergo stripping. Reformulation to avoid stripping has the disadvantage of either high formulation cost (associated with microencapsulation) or insufficient reduction of stripping factor (associated with solvent variations). The pesticidal efficacy of microencapsulated formulations may also be reduced, particularly when rapid initial insect knock-down is desirable or when rapid diffusion of active ingredient through the wool grease is required.

SUMMARY OF THE INVENTION

This invention provides a method of dipping a number of animals of a species with a pesticide using a formulation of the pesticide which is subject to stripping of the pesticide during dipping of successive animals or groups of animals, the method including:

establishing a predetermined level of a dipping liquid containing a first concentration of the pesticide ($C_{IC}$) in a vessel said concentration providing safe and effective pesticidal treatment;

dipping the animals in the dipping liquid; and maintaining the predetermined level of the dipping liquid in the vessel by addition thereto of a replenishment composition containing a second concentration of the pesticide the second concentration of the pesticide ($C_{CR}$) being greater than the first concentration of the pesticide, to thereby maintain a safe and effective concentration of the pesticide.

Preferably when the cumulative volume of dipping liquid removed from the vessel by the animals is at least half the dip volume, the concentration of pesticide within the vessel is within 30 percent of the first concentration.

In practice we have found that the tendency of pesticide in a dip to strip can be described by by a measure called stripping factor (SF).

SF may be determined from an independent dipping operation in which animals are dipped in a dipping liquid of the first concentration ($C_{IC}$) and the volume of dipping liquid is maintained by replenishment with dipping liquid of the first concentration.

Thus the sufficient animals are dipped to allow a steady state concentration of pesticide ($C_{SS}$) to develop in the dip. The tendency for the pesticide to strip in this and similar circumstances can then be defined by the Stripping Factor (SF), wherein $$SF = C_{IC}/C_{SS}$$

Preferably the dipping liquid of the first concentration ($C_{IC}$) has a Stripping Factor (SF) of at least two and said second concentration ($C_{CR}$) and said first concentration comply with a relationship wherein that the product of the first concentration ($C_{IC}$) and the Stripping Factor (SF), divided by the second concentration ($C_{CR}$) lies in the range 0.2 to 2.0 ie $$0.2 < C_{IC} \cdot SF/C_{CR} < 2.0$$

the stripping Factor SF being determined as outlined above

Surprisingly it has been found that to maintain an adequate level of pesticide in the dip, the replenishment concentration has to be at least twice the initial charge of the dip.

More preferably $C_{IC} \cdot SF/C_{CR}$ is in the range of 0.5 to 1.5. Most preferably $C_{IC} \cdot SF/C_{CR}$ will be 1.0.

The invention also provides for use of an initial or first concentration of pesticide and an operational dip concentration that provides the animals with a pesticide dose equal to, or within a selected safety margin above, the minimum effective dose (MED).

The level of dipping liquid in the vessel may be maintained by continuous replenishment with a mixture of water and formulated pesticide to the sump over all or most of the dipping time. For a plunge dipping station, the process of continuous replenishment leads to the maintenance of the liquid level in sump at a fixed predetermined level (in practice, variations of less than 20% and preferably less than 10% about the predetermined level can occur). For a shower dipping station, the process of continuous replenishment leads to the maintenance of liquid level in the sump at a predetermined level, with the proviso that said level is measured at a fixed stage of the batch spraying process, and allows for the volume of liquid taken up in the dispensing equipment.

In practice, the method of treatment in accordance with the invention may be represented using a chart, table, graph or equivalent representation for a particular suitable pesticide formulation, in which sump volume (or some factor highly correlated with sump volume) is related simply to an appropriate initial charge concentration of pesticide for the sump and a concentration of pesticide for constant replenishment. Recommended initial charge and replenishment concentrations would depend on whether dipping was being conducted by spray or plunge, but generally operator instructions relating to the invention may be much simpler than the complex replenishment and reinforcement requirements of traditional dipping practices.

The extent of stripping is quantified by the Stripping Factor. This measure varies with factors including:
(a) the nature of the active ingredient;
(b) the nature of the formulation comprising the active ingredient, and in particular the nature of the solvent in the said formulation, if the active ingredient is maintained in the dipwash as an emulsion;
(c) the dipping method (plunge or shower dip); and
(d) the sump volume of the dipping station, or some other factor(s) highly correlated with sump volume. These related factors presumably could include features of dip operation that influence degree of exposure of the dipping liquid (active ingredient) to the stripping effect of the animal surfaces (e.g., length of the bath, swim distance and/or time in plunge dips, showering time/sump turnover in shower dips).

The Stripping Factor applicable to this invention may be determined by quantifying the extent of stripping observed when for a given formulation of a given active ingredient using a given dipping method and a given sump volume, a dipping operation is carried out wherein the concentration of active ingredient in the initial charge of pesticide added to the sump equals the concentration of active ingredient in the replenishment charge added to the sump.

Dipping is continued until an approximate steady state has developed between pesticide addition and removal. The concentration of pesticide in the dip at this state ($C_{SS}$) is used to evaluate the tendency for stripping to occur (SF) using the ratio $C_{CR}/C_{SS}$ as previously described. Note that $C_{IC}=C_{CR}$.

SF will always be greater than 1 where stripping occurs and the larger the value of SF the more prominent is the stripping effect.

In order to establish $C_{SS}$ and SF, where insufficient animals have been dipped or are available to be dipped to allow confirmation that a steady state between pesticide addition and removal has been established, a curve-fitting procedure such as that hereinafter described may be used to determine both $C_{SS}$ and SF. The stripping factor may also be determined by:
(i) dipping a number of animals in a dipping liquid of initial concentration $C_{IC}$ contained in the vessel and maintaining the level of liquid in the vessel during dipping by replenishment of the liquid removed with a dipping liquid of the first concentration equal to $C_{IC}$ and preparing a graph of concentration of pesticide against numbers of animals.
(ii) generating an array of calculated stripping curves showing the change in concentration of pesticide during dipping for a range of SF values using the formula $$(C_n) = \frac{V_A C_{IC} + C_{n-1} V_S}{V_S + V_A SF}$$

wherein
$V_s$ is the volume of dipping liquid
$V_A$ is the average volume of dipwash removed per animal
$C_n$ is the concentration after passage of the nth animal
$C_{IC}$ is the first concentration; and
comparing the graph determined in step (i) with the array of calculated stripping curves to determine the stripping factor corresponding to the closest fitting calculated stripping curve.

DETAILED DESCRIPTION

The invention may utilise known dipping equipment of the plunge dip or shower dip types. FIGS. 1(a) to 1(d) in the attached drawings show suitable examples of equipment which may be used in the method of the invention and preferred embodiments of the invention will be described with respect to this dipping equipment. It will be understood, however, that many variations also may be used.

Figure 1A:
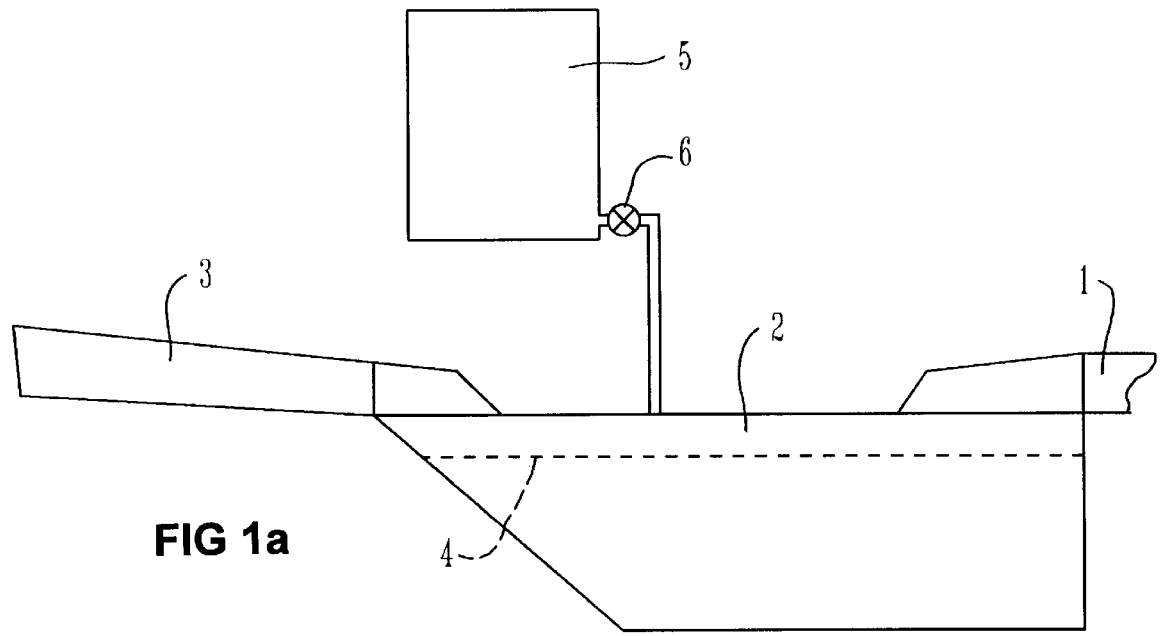
FIGS. 1(a) and 1(b) show side and top views, respectively, of a plunge dip station that may be used in accordance with one embodiment of the invention.
Figure 1B:
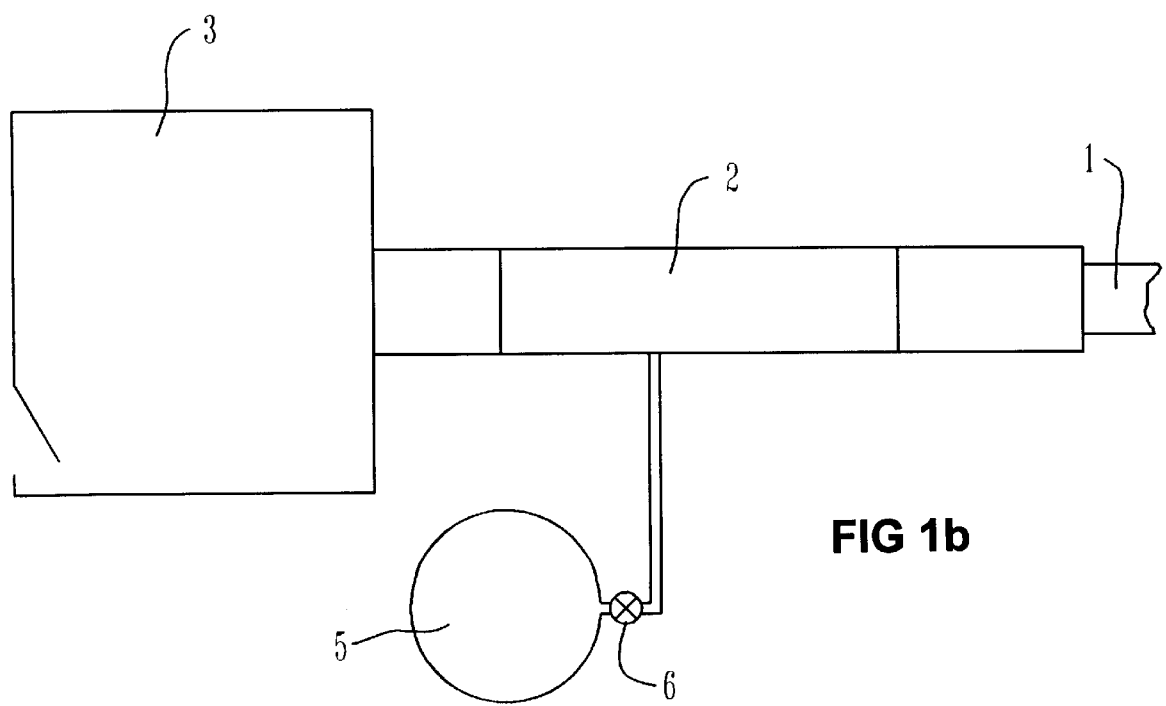

FIGS. 1(a) and 1(b) show side and top views respectively of a plunge dip station. The plunge dip station includes a lead up race (1) for guiding animals into the dip, a sump or dip (2) for retaining the dipping liquid and in which the animals are at least partly and preferably fully immersed and a drain pen (3) on which animals that have been dipped are retained for a period. The draining pen may provide a return of excess liquid from the animals to the sump. The sump (2) will generally contain dipping liquid to a predetermined level (4) and is provided with a replenishment tank (5) adapted to provide replenishment of dipping liquid lost from the sump (2). A flow of dipping liquid from the replenishment tank (5) to the sump is controlled by means (6) such as a valve or stop cock. Level operated valves such as ball float valves or the like are particularly useful.

Figure 1C:
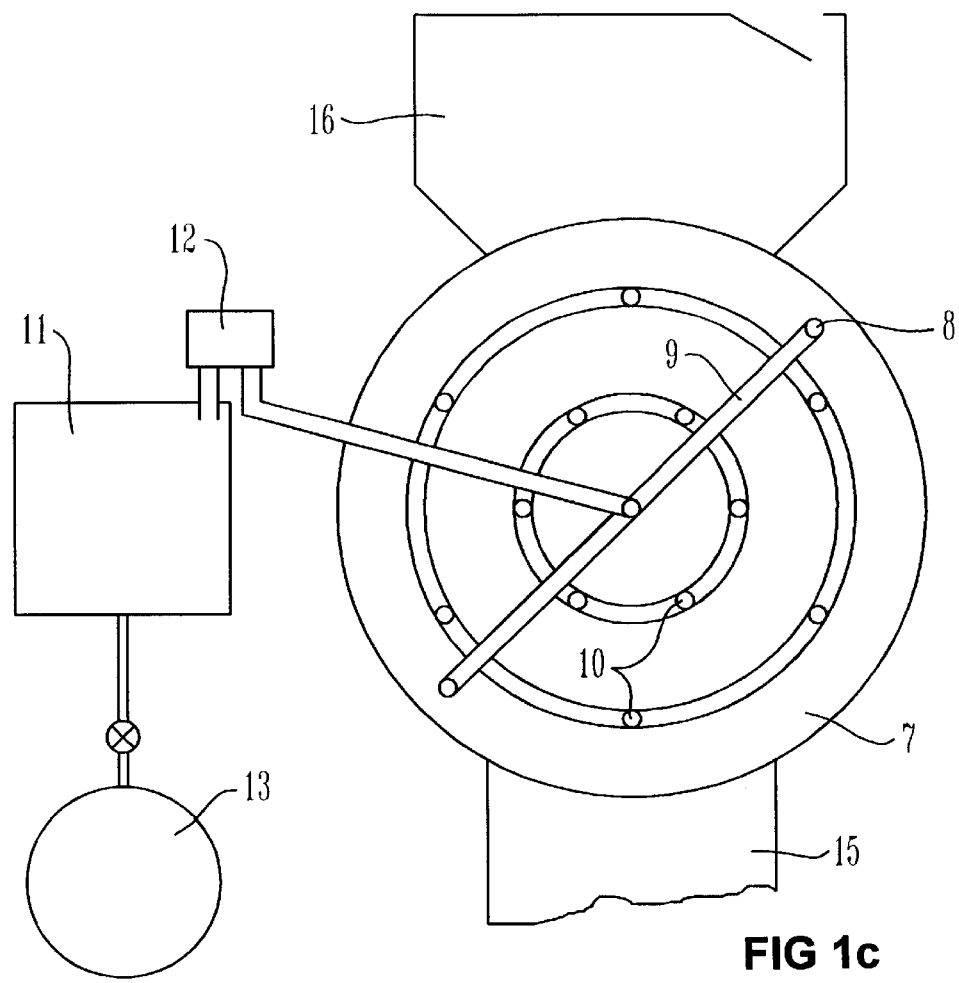
FIGS. 1(c) and 1(d) show side and top views, respectively, of a shower dip station that may be used in accordance with another embodiment of the invention.
Figure 1D:
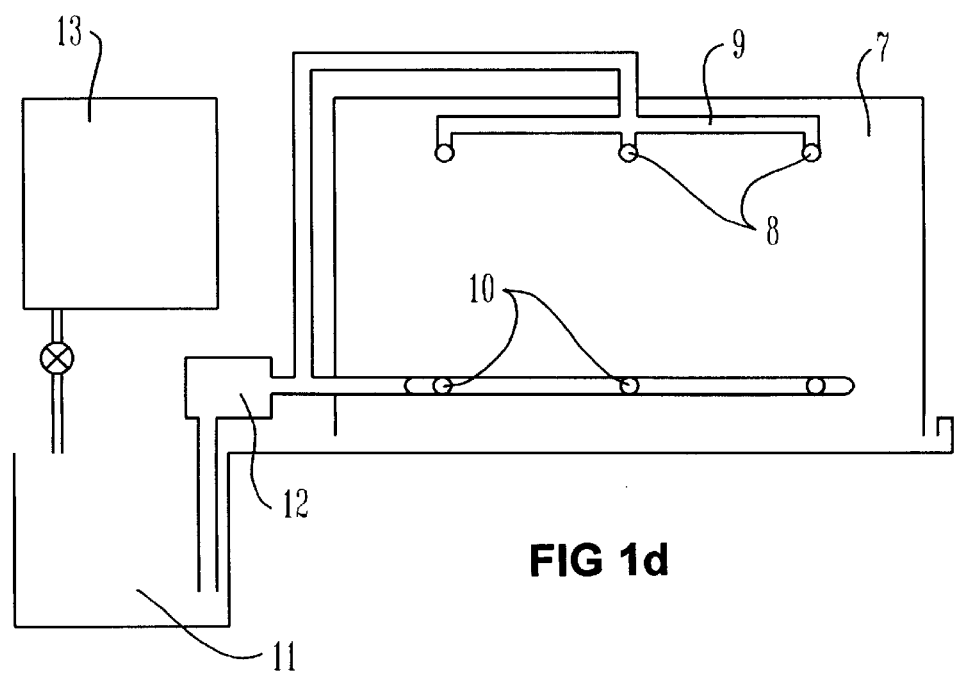

FIGS. 1(c) and 1(d) in the attached drawings show side and top views respectively of a shower dip station. This station includes a shower pen (7) provided with nozzles (8) for providing a spray of dipping liquid onto the animals. It is preferred that, as shown, an upper set of nozzles (8) is provided on a boom or rotating arm (9) above the animals and a further lower set of nozzles (10) is provided for directing liquid upward from below the animals. The shower station is provided with a sump (11) for retaining dipping liquid and a pump (12) for providing a flow of liquid under pressure to the nozzles. The shower station is provided with a replenishment tank (13) which is connected to the sump and flow of replenishment liquid to the sump is regulated by a control valve or stop cock (14).

An entry race (15) and draining pen (16) are also provided.

The sump is preferably provided with a predetermined level of dipping liquid. The level may be regulated by a valve such as a float valve for reestablishing the predetermined level after treating batches of animals.

For plunge dipping stations, a quantitative description of the stripping process may be obtained from a graphical plot of the concentration of active ingredient in dipping liquid within the sump, against the number of animals which have passed through the dipping station, wherein $C_{IC}=C_{CR}$ and replenishment liquid is added at a rate that will maintain the level of pesticide in the dip. Such a plot generally depicts a curve which will herein be referred to as a plunge stripping curve. An example of such a curve is provided in FIG. 2.

Figure 3:
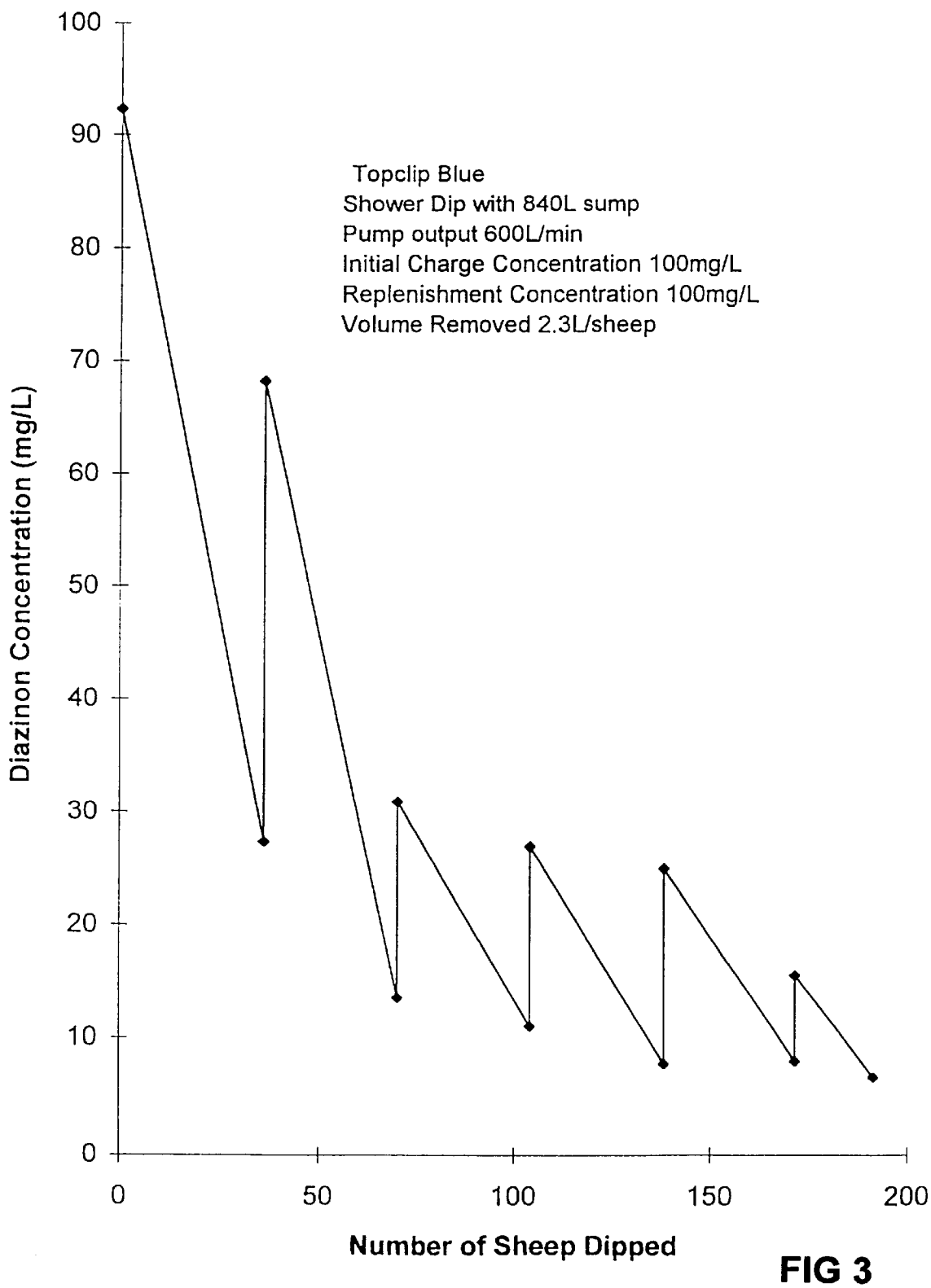
FIG. 3 is a plot of concentration versus sheep number for a shower dipping station operated by batch replenishment.

For shower dipping stations, a quantitative description of the stripping process may be obtained by graphically plotting the concentration of active ingredient in the sump liquid at the beginning and end of each batch, against the number of sheep which have passed through the station. The measurements are conducted at the beginning and end of each batch, because at other times an undetermined quantity of dipping liquid is retained in the delivery pipes and the floor drain to the sump. FIG. 3 shows an example plot of active concentration versus sheep number for a shower dipping station operated by batch replenishment. The straight-line segments which connect concentrations found at the start and finish of a given batch show the change in concentration on replenishment; these lines are notional only and are provided in order to make the stripping curve easier to read. In fact, all the sheep in a given shower batch receive an equivalent amount of active ingredient. The concentration values for the stripping curve are best evaluated at the start and finish of a batch when the pesticide is primarily in the sump.

In an unreplenished dip the concentration of pesticide in the dip sump will approach zero as a large number of sheep are dipped. In a constantly replenished dip, stripping by large numbers of animals will lead to a steady state concentration of pesticide being developed in the dip whereby the rate of removal of pesticide on the dipped animals equals the rate of addition of pesticide in the replenishment liquid.

The effect of stripping in a batch replenished shower dip can more clearly be seen if only the concentration of active ingredient in the sump of the dipping station immediately prior to the start of each batch spraying are plotted against sheep number. Such a plot will herein be referred to as a shower stripping curve. An example is provided in FIG. 3(a), using the same data as FIG. 3.

Figure 2:
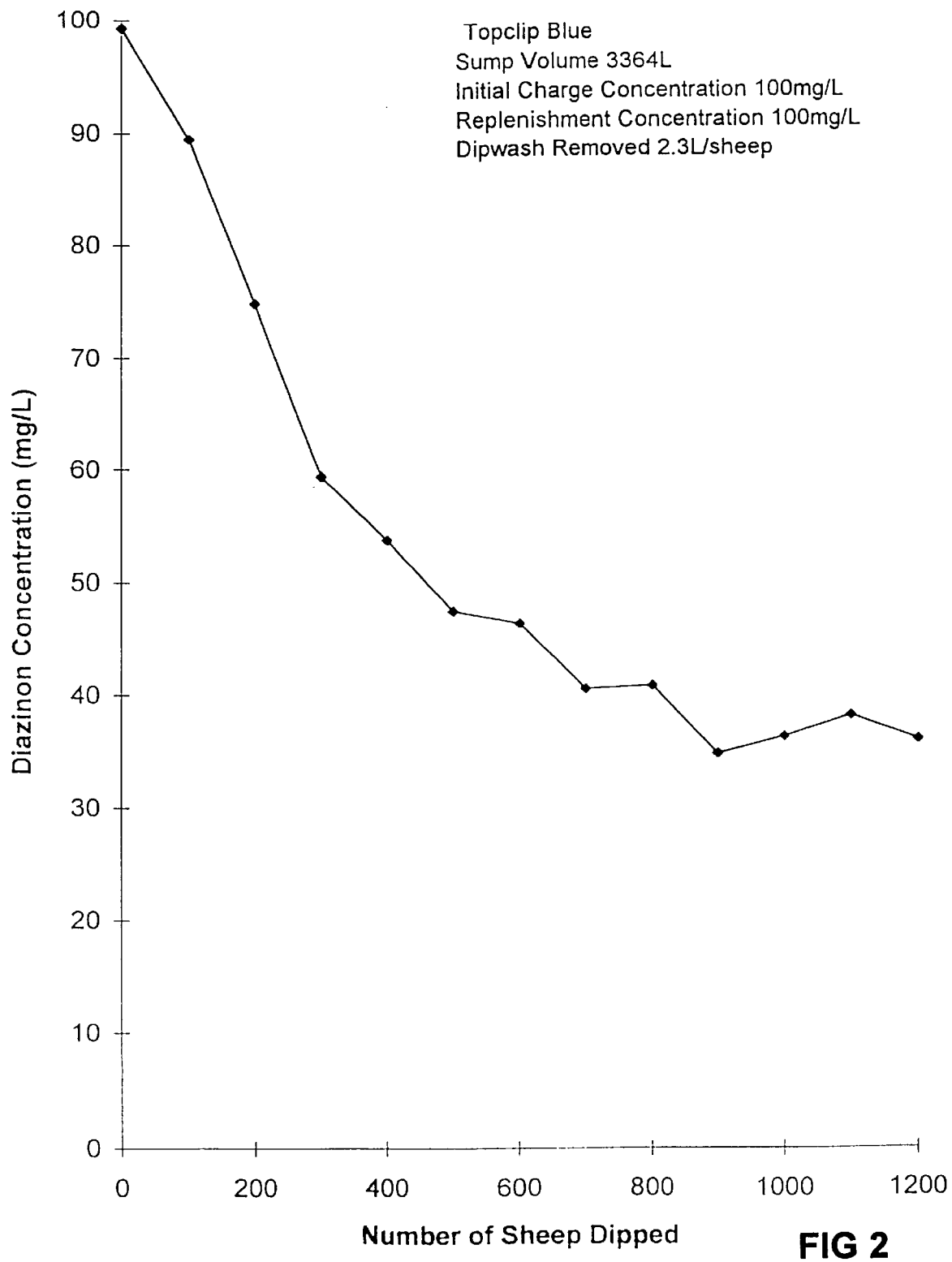
FIG. 2 is a plot of concentration of active ingredient versus a number of animals passed through a dipping station.
Figure 3A:
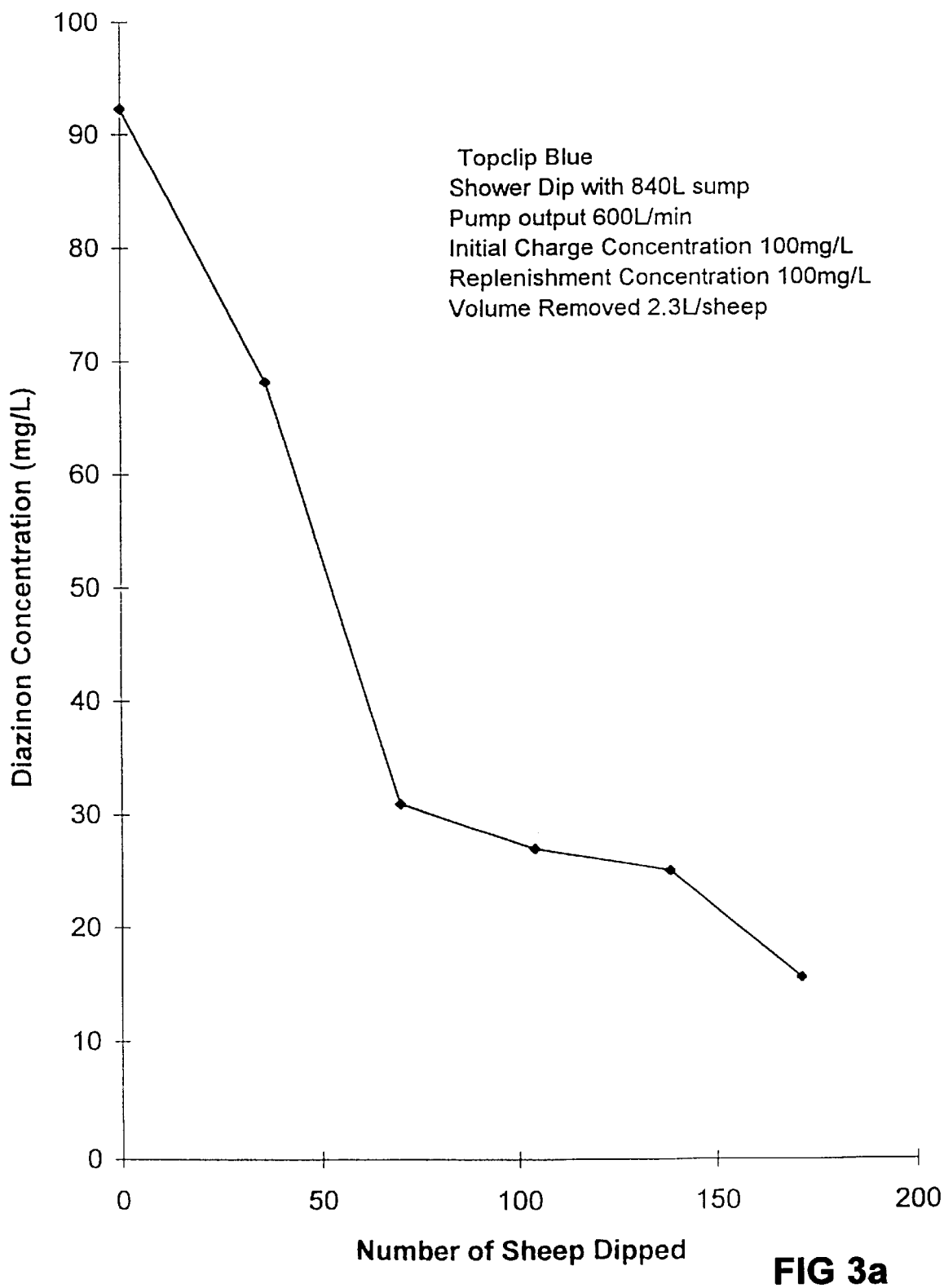
FIG. 3a is an example plot of a shower stripping curve.

FIGS. 2 and 3(a) clearly show that the concentration of active ingredient decreases steadily in the dipping liquid as the number of sheep dipped increases. Equivalent stripping curves may be obtained by plotting the concentration of active ingredient against the cumulative volume of dipping liquid removed from the sump (assuming each animal removes a constant volume of dipping liquid).

It is important to note that the Stripping Factor may change with the method of administration. For example, the Stripping Factor of the diazinon formulation in a plunge dip (FIG. 2) is about 3, whilst the Stripping Factor for the same formulation in a shower dip (FIG. 3a) is about 6.5.

This invention relates to high or medium-stripping water based pesticidal dipping liquids as defined later.

These dipping liquids may be produced using an active compound or combination of active compounds with suitable pesticidal activity. The actives must be delivered in a formulation such that stripping occurs (ie. such that there is preferential movement of the active from the dipping liquid to the animal surface).

Formulations that provide a suitable stripping liquid may be in any of the forms described for dilution of concentrates with water described on pages 2–6, Catalogue of Pesticide Formulation Types and International Coding System, Technical Monograph No. 2, GIFAP (International Group of National Associations of Manufacturers of Agrochemical Products, Avenue Hamoir, 12 1180 Brussels, Belgium). Preferred formulation types include EC's (emulsifiable concentrates), EW's (emulsions in water) and WP's (wettable powders).

The rate of replenishment of the dip with the second concentration may be controlled by a means of a ball-cock or like device and preferably will not allow the level of liquid to drop below 20% less than the volume of dipping liquid at the commencement of dipping. The dip volume is preferably in the range of from 200 to 100,000 L and most preferably less than 15,000 L. The preferred situations for use of the invention are where the stripping factor SF is greater than two (2).

The pesticidal formulation when diluted for use in the process of the invention is preferably in the form of an emulsion or suspension. Such formulations may comprise a water immiscible dispersed phase which may for example comprise a hydrocarbon. A typical example of such a formulation includes (on a weight basis):

oil phase—% 10 to 99%
surfactant—% 0.1 to 30%
pesticide—% 1 to 89.9%

The pesticide component of the composition of the invention may comprise one or more endoparasiticides and/or one or more ectoparasiticides. Preferred pesticides are selected from the groups of organophosphates, carbamates, formamidines pyrethroids, macrocyclic lactones and insect growth regulators. Most preferably the parasiticide component of the composition of the invention comprises at least one organophosphate compound. The preferred organophosphorous compounds include dimethylphosphates such as dichlorvos; diethylphosphates such as chlorfenvinphos and bromfenvinphos; dimethyl O-phosphorothioates such as parathion-methyl and fenitrothion; diethyl O-phosphorothioates such as chlorpyrifos-ethyl and diazinon; dimethyl S-phosphorothioates; diethyl S-phosphorothioates such as acetofos; dimethylphosphorodithioates; diethyl-O-phosphorodithioates, diethylphosphorodithioates and phosphoroamidothioates such as propetamphos, methamidophos, acephata, fenamiphois, phosfolan, mephosfolan and fosthietan. The most preferred of the organophosphorous insecticides are propetamphos and diazinon which are the most preferred pesticides for use in the present invention.

The particularly preferred formamidines are amitraz.

The preferred pyrethroids for use in the present invention are permethrin, phenothrin, deltamethrin, cypermethrin, cyhalothrin, flumethrin, cyfluthrin, cyphenothrin, tralomethrin, tralocythrin and fenvalerate. Cypermethrin, cylohalothrin and deltamethrin are particularly preferred.

Preferred examples of macrocyclic lactones include ivermectin, abamectin, moxidectin and doramectin. Preferred examples of insect growth regulators include fluazuron diflubenzuron, triflumuron lufenuron and ethoprene.

Other pesticides which may optimally be present include piperonyl butoxide, magnesium, fluorosilicate, sulphur and arsenic.

The formulations used in the method of the invention may comprise additives such as surfactants, working agents or solvents which may or may not differ in concentration between first and second concentrations of pesticide.

Formulations which are measured to have a stripping coefficient of 3 or greater are referred to as high-stripping formulations. Formulations which are measured to have a stripping coefficient of 2 or greater but less than 3 may be referred to as medium-stripping formulations, whilst formulations with measured stripping coefficients of less than 2 but greater than 1 may be denoted low-stripping formulations.

Clearly a change in use context (eg. from plunge dip to shower dip) can see a given formulation change in classification from high-stripping to medium-stripping. Altering the nature of the formulation can also result in a particular active ingredient changing in classification from high to medium or low stripping.

The invention further provides a dipping system for administering a pesticide to a number of animals of a species using a formulation of the pesticide which is subject to stripping of the pesticide during dipping of successive animals or groups of animals the system including:

(i) a dipping vessel containing a dipping liquid containing a first concentration ($C_{IC}$) of a pesticide, said concentration being chosen to provide safe and effective treatment;

(ii) a replenishment vessel containing a replenishment composition containing a second concentration of the pesticide ($C_{CR}$) and for replenishing liquid lost from the dipping vessel;

(iii) means for transferring liquid from the replenishment vessel in response to a drop in level of dipping vessel; and wherein the second concentration of the pesticide is greater than the first concentration.

The system will preferably include means for retaining said liquid to be applied to the animals at a predetermined level within the sump by adding liquid from the replenishment tank. The means for retaining the predetermined level may be any convenient level maintenance means such as a ball cock valve, but will preferably retain the continuous or batch-end levels within less than 10% variation.

The present invention allows a reliable efficacy so that a predictable and confined dose range of pesticide can be delivered to each and every animal. Therefore the results of minimum pesticidal dose experiments can be incorporated into the recommendations for charge and replenishment concentrations on the product label. The label recommendations for charge and replenishment concentrations can define conditions for a much more constant concentration of active ingredient in the dip (ie. relatively flat stripping curves; Examples 9–12). This removes the likelihood of relatively low animal doses on later dipped animals in traditional constant replenishment dipping (where poor efficacy may be a problem). The invention also removes the need for the complex replenishment and reinforcing practices or the use of complex replenishment and reinforcing recommendations intended to alleviate this problem. More particularly, the invention enables practical operation of the dip with lower initial charge recommendations than those of conventional dipping practice.

The present invention also allows the dose of pesticide applied to each animal to be controlled, such that the residual amount of pesticide on the surface of individual animals is much more uniform than conventional dipping practices. Withholding periods for edible components prior to slaughter or fleece prior to shearing can therefore be determined with greater reliability. In most cases the withholding period will be shorter, due to the elimination of animals receiving a much higher dose than needed as a result of the high charge rates used in conventional practice. The highest dosed animals, of course, determine the required withholding period for all animals in the dipped group. Similarly, the invention allows the probability of animals receiving a toxic dose to be reduced. The chance of toxic effects on the dipped animals is reduced because under the present invention the first animals dipped can receive a much lower dose than first animals dipped under conventional dipping practices. Traditional dipping practices use a high initial dose to counter the reduction in efficacy of dosing with the increasing number of sheep dipped.

The invention may similarly allow a reduction in total chemical usage. This is possible because the dipping liquid in the sump may not need to be discarded after "1 sheep dipped for every 2 liters of original sump volume" which is often described in the literature on conventional sheep dipping practice. This practice may be recommended to prevent the pesticide concentration in the dip falling below the minimum effective pesticidal dose.

The invention generally also reduces operator exposure to dip chemicals. This reduction arises because the dipping liquid (also called dipwash) to which the operators are exposed, can be 2–5 fold lower concentration than early in the traditional dipping methods, despite the use of a higher $C_{CR}$ than traditional dipping.

The invention will now be demonstrated, but is in no way limited by, the following examples.

COMPARATIVE EXAMPLES

The effect of a number of dosing methods on the concentration of active ingredient in dipping liquids were studied.

These methods involved combinations of particular procedures for charging (adding) dipping liquid into the sump of the dipping station. Under conventional dipping practices, there is a range of methods used to establish or replenish the dipping liquid. These are referred to as initial charging (for establishing the initial concentration of active ingredient in the dip), and periodic replenishment charging, reinforcement charging, batch-by-batch replenishment charging and continuous replenishment charging (to maintain the concentration of active ingredient in the dip).

Initial charging refers to the addition of dipping liquid to an empty sump at the commencement of the dipping process. This may take the form of independently charging water and concentrated active ingredient in a defined ratio, or may take the form of mixing water and concentrated active ingredient to a defined ratio in a separate vessel or tank, and transferring the liquid (in the defined ratio) to the sump.

Replenishment charging (also called topping up) refers to the addition of active ingredient and water to a sump which has previously been depleted to a given level (say to 75% of initial sump volume) thereby restoring the volume of liquid in the sump to the initial level. Replenishment charging can involve the separate addition of water and of concentrated active ingredient, or can involve the addition of a liquid comprising both water and active ingredient. In the latter case, the concentration of active ingredient in the liquid which is added to the sump may be the same as the concentration in the initial charge, or it may be different (generally slightly higher). Reinforcement charging refers to the addition of a concentrated formulation of active ingredient to the sump of the dipping station, in order to increase the concentration of active ingredient in the sump, but without significantly increasing the volume of liquid in the sump. Reinforcement charging can be associated with the final stage of the dipping process (called dipping out) wherein a reduced volume of dipping fluid in the sump is used to reduce wastage of pesticide. Reinforcement charging can also be used together with replenishment charging, in which case the replenishment charge restores the liquid level in the sump and the reinforcement charge restores the concentration of active ingredient in the sump.

Batch-by-batch replenishment charging refers to the addition of active ingredient and water to the sump of a plunge or shower dipping station at the completion of each batch. The addition can involve the independent addition of water and active ingredient, but more commonly involves the addition a liquid comprising both water and active ingredient. In the latter case the concentration of active ingredient in the liquid which is charged is generally the same as the concentration of active ingredient in the initial charge.

The concentration of active ingredient in the initial charge, the periodic replenishment charge, the reinforcement charge, the batch-by-batch replenishment charge and the continuous replenishment charge will hereinafter be designated by the symbols $C_{IC}$, $C_{PR}$, $C_{RE}$, $C_{BB}$, and $C_{CR}$ respectively. Where water and concentrated active ingredient are independently dosed to the sump in order to provide a particular charge (e.g., a replenishment charge), the term "concentration of active ingredient in the charge" and like terms refer to the concentration of active ingredient based on the total amount of added active and water in the charge.

Figure 4:
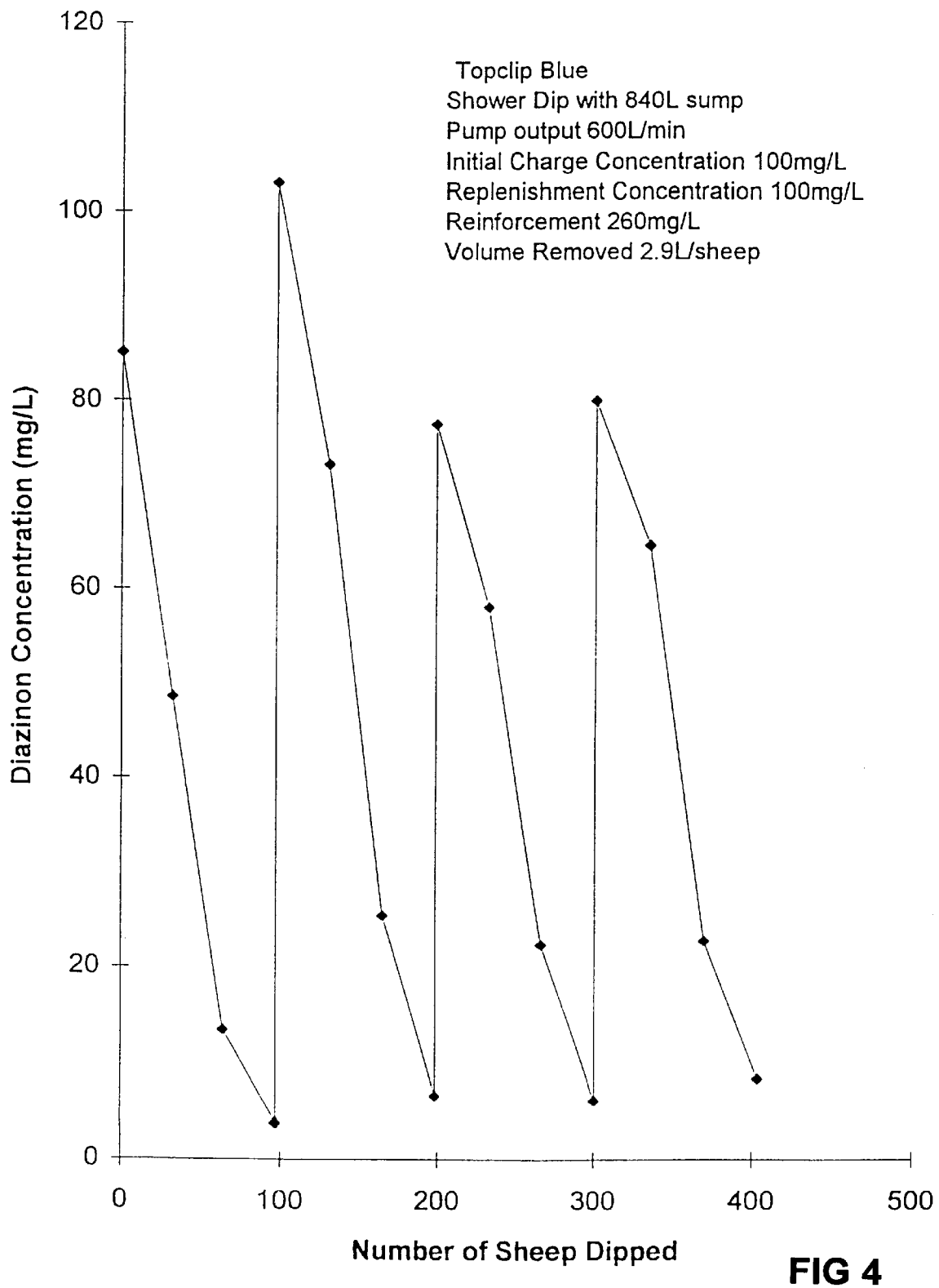
FIG. 4 is an example plot of a shower stripping curve wherein the stripping method includes using traditional periodic replenishment shower or plunge dipping with reinforcement charging.

The procedures studied were as follows:
1. Periodic replenishment shower or plunge dipping together with reinforcement charging. The plot of pesticide concentration verses number of sheep dipped (stripping curve) shown in FIG. 4 was generated by dipping Merino sheep approximately 4 weeks after shearing with a diazinon emulsifiable concentrate (EC) formulation (200 g/L, Topclip Blue Shield, Ciba Geigy (Aust.) Ltd, herein referred to as Topclip Blue), using a Buzzacott 30R shower dip according to manufacturers specifications. The sump was run at a maximum volume of 840 L. Initial charge was nominally 100 mg/L diazinon. Three batches of sheep (approx. 32 per batch) were dipped for 6 minutes and drained for 2–3 minutes before the sump volume had fallen by 25%. The periodic replenishment and reinforcing steps can be seen in FIG. 4 as the dramatic increase in diazinon concentration after every third batch of sheep (3 peaks). Reinforcement consisted of addition of 250 mls of Topclip Blue. Replenishment then occurred using approximately 200 L water and 100 mls Topclip Blue. A 200 ml sample of dipwash was taken for diazinon analysis before the start of dipping, after every batch was dipped and after all topping up plus reinforcement operations.

The undesirable aspect of this dipping procedure is the widely different mean pesticide concentration to which each batch of sheep was exposed.

Figure 5:
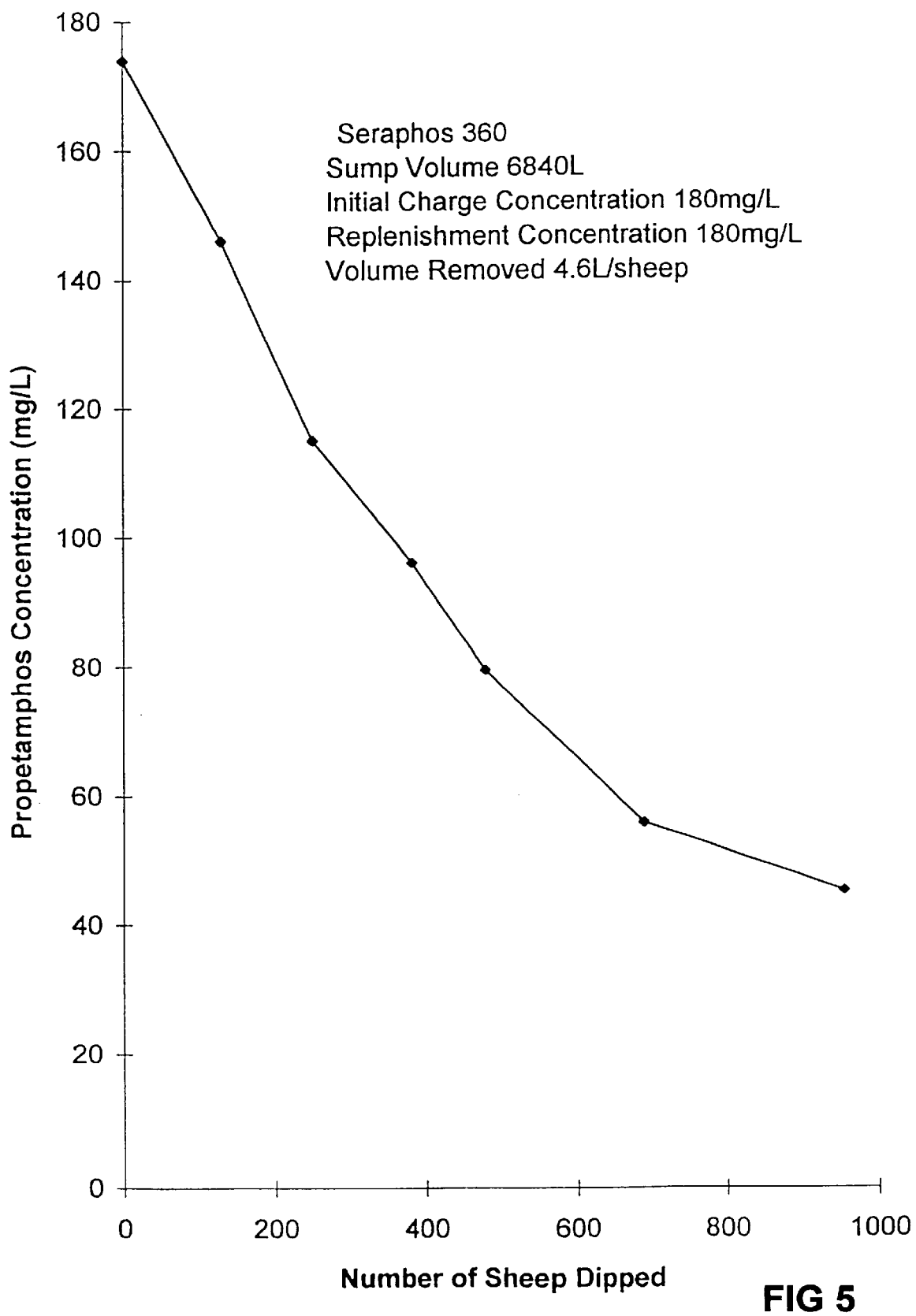
FIG. 5 is an example plot of a shower stripping curve wherein the stripping method includes traditional continuous replenishment plunge dipping.

2. Continuous replenishment plunge dipping, wherein the concentration of the continuous replenishment charging fluid is the same as the concentration of the initial charging liquid. The stripping curve shown in FIG. 5 and was generated by dipping Merino sheep carrying 4–5 weeks wool using a propetamphos EC (360 g/L, Seraphos 360, Nufarm Ltd) and a plunge dip of approximately 6840 L volume. Initial charge was nominally 180 mg/L propetamphos. The sheep took approximately 20 seconds to swim the length of the dip during which time they were dunked (totally immersed) twice. The dip was constantly replenished from a 4500 L tank containing nominally 180 mg/L propetamphos to maintain the dip volume at 6840 L. The sheep were permitted to drain briefly as per normal practice and drainings returned to the dip. A sample of dipwash for analysis of propetamphos concentration was taken after approximately every 100 sheep.

For all commercially available products that are commonly used according to the continuous replenishment method, manufacturer recommendations state that the concentration of active ingredient in the replenishment charge is not more than the concentration of active ingredient in the initial charge as previously illustrated in Table 1.

The undesirable aspect of this procedure is the wide discrepancy between the concentrations of pesticide to which sheep are exposed early and late in the dipping process.

3. Batch-by-batch replenishment shower dipping wherein the concentration of active ingredient in the batch-by-batch replenishment charging liquid is the same as the concentration in the initial charge.

Figure 6:
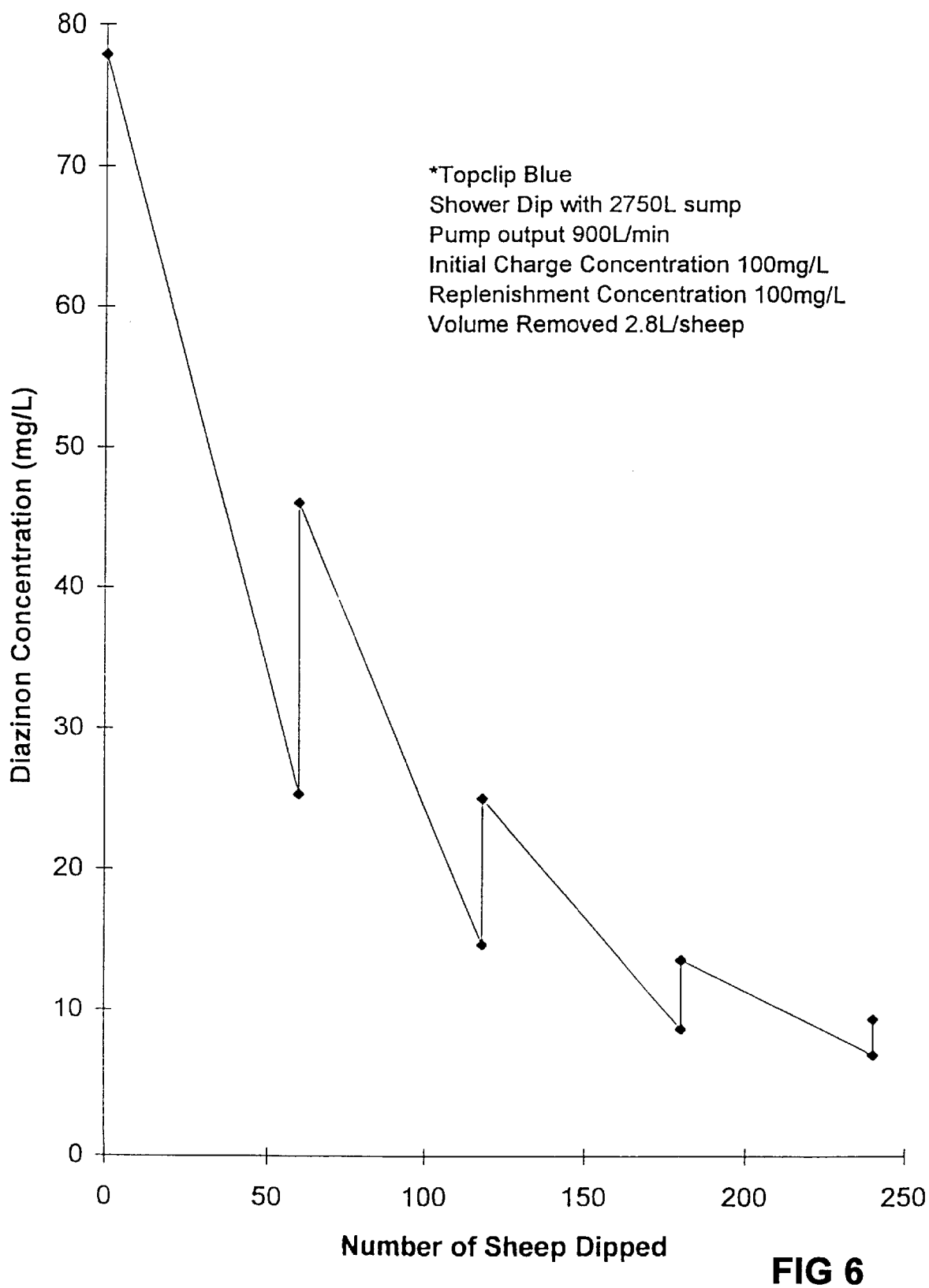
FIG. 6 is an example plot of a shower stripping curve wherein the stripping method includes traditional batch-by-batch replenishment shower dipping.

The stripping curve denoted in FIG. 6 was obtained when dipping Merino wethers (3–4 weeks wool) with Topclip Blue, using a shower dip (Buzzacott 60R, operated according to manufacturers specifications). The initial charge concentration was 100 mg diazinon/L. Each batch of sheep comprised approximately 70 sheep. The dip sump was replenished to 2750 L at the conclusion of draining of each batch. Premixed replenishment liquid (diazinon 100 mg/L) was stored in a 2500 L tank. Samples of dipwash (200 mls) were taken at the start of dipping, after the conclusion of draining of each batch and after replenishment of the dipping liquid in the sump. Influence of the replenishment operations is denoted in FIG. 6 by the vertical increases in diazinon concentration (4 occasions).

Again the undesirable aspect of this procedure is a wide discrepancy between the concentrations of pesticide to which sheep are exposed early and late in the dipping process.

Traditional dipping instructions for continuously replenished dips use the same or similar pesticide concentrations to charge and replenish dips (Table 1), wherein the effect of stripping is offset by high initial pesticide concentrations.

TABLE 1

List of sheep dipping products sold in Australia, showing their recommended continuous replenishment, initial charge and replenishment charge concentrations.

| Product | Active Ingredient | Dip Type | Continuous Replenishment Concentrations | |
|---|---|---|---|---|
| | | | Initial Charge ($C_{IC}$, mg/L) | Replenishment Charge ($C_{CR}$, mg/L) |
| Coopers 4 in 1 Dip | Diazinon | SH | 300 | 300 |
| Dijet | Diazinon | SH | 100 | 100 |
| Topclip Blue | Diazinon | NS | 100 | 100 |
| Asuntol | Asuntol | NS | 300 | 300 |
| Amidaz | Diazinon | SH | 200 | 200 |
| | Amitraz | SH | 250 | 250 |
| Grenade | Cyhalothrin | SH | 20 | 20 |
| Grenade + Rotenone | Cyhalothrin | SH | 20 | 20 |
| Seraphos 360 | Propetamphos | SH | 180 | 180 |
| Supreme Sheep Dip with Lanolin | Cypermethrin | PL,SH | 19 | 19 |
| Ectomort | Propetamphos | SH | 180 | 180 |

SH = Shower Dip
PL = Plunge Dip
NS = Not Specified

It is important to note that the reason for widespread farmer acceptance of the above dipping methods is that they are very user-friendly. The control and monitoring of the dipping process is based on the maintenance of the sump liquid level at a predetermined height, or the maintenance of said level within a range specified by a predetermined upper and lower height.

Periodic replenishment charging methods do not require the existence of a separate liquid holding vessel (other than the sump) although such a separate vessel may be used if convenient. Batch-by-batch and continuous replenishment charging methods generally do require the existence of a separate liquid holding vessel (other than the sump). When the continuous replenishment method is used in conventional dipping practice, the concentration of active ingredient in the replenishment charge equals the concentration of active ingredient in the separate liquid holding vessel or tank, and also no reinforcement charging occurs.

Simple, inexpensive and user-friendly as are the above mentioned 3 methods, they all (when carried out according to the manufacturer's recommendation) are characterised by the existence of significant variations in the concentration of active ingredient in the sump during the dipping process. This variability is, of course, transposed to high variability in dose of pesticide applied to animals within the group to be dipped. In consequence, some or all of the disadvantages associated with the stripping of active ingredients occur.

Key elements of the present invention are the selection of an appropriate initial concentration of pesticide for the dip followed by the determination of a stripping factor (SF) and the relationship $0.2 < SF \cdot C_{IC}/C_{CR}$ to derive the appropriate $C_{CR}$ for dip operation. The following examples illustrate the derivation and use of the invention to overcome the problems associated with traditional dipping.

Example (1a)

Experimental Determination of Stripping Factor (SF)

The Stripping Factor SF may be established using a continuously replenished dipping operation in which the concentration of active ingredient in the initial charge equals the concentration of active ingredient in the replenishment charge.

The dipping operation is continued with successive monitoring of the concentration of pesticide concentration in the dipwash, until the steady state concentration ($C_{SS}$) of the dip is attained. This will probably require dipping of a sufficient number of sheep such that the cumulative volume of dipping liquid removed equals the sump volume of the dip. For a large dip (e.g., 7000 L sump) this could require dipping of 5000 sheep. SF is then determined simply by dividing the starting concentration $C_{IC}$ (which equals $C_{CR}$ in this case) by the $C_{SS}$ value. It should be noted that the value of SF depends on the dipping method (plunge or shower), the sump volume, pump output in a shower dip, the active ingredient and the particular formulation of active ingredient used.

FIG. 2 shows an example situation whereby the approximate $C_{IC}$ and $C_{SS}$ values are 100 mg/L and 35 mg/L respectively, giving an of SF estimate of 2.9.

Example (1b)

Approximation of SF Using the Concept of 's'

Let s(n) denote the stripping factor (SF) for the nth animal as herinafter defined. Generally s(n) varies with n however its average value is a useful approximation of SF (commonly within 10%). The estimation of s(n) values have been particularly useful for estimation of stripping by dips that have not operated long enough (i.e. have not had enough sheep dipped for $C_{SS}$ to be developed). Procedures for the evaluation of s(n) are described below.

Terms

G(n) represents the concentration of active ingredient in or on the external regions of the $n^{th}$ animal immediately after that animal has left the dipping station. This is a notional concentration only, which is established by taking the weight of active ingredient on the animal and dividing by the volume of dipwash removed by the animal ($V_A$). The units of g(n) are grams per liter.

$V_S$ represents the sump volume (liters).

$V_A$ represents the volume of dipwash removed per animal (liters)

C(n) is the concentration of active ingredient in the sump at the time of exit of the $n^{th}$ animal. This is the primary measured quantity in the evaluation of the stripping coefficient according to the above-noted experimental configuration. The stripping curve can be represented by specifying the measured value of C(n) at a range of n values (for shower dips, C(n) is best established immediately before the commencement of showering of a batch—the n values for which C(n) is measured will thus in general be a multiple of the average number of animals per batch). If a stripping curve is supplied as given information, the value of C(n) can be found by noting which concentration corresponds to a given animal number. The units of C(n) are grams per liter.

$V_R(n)$ represents the cumulative volume of replenishment liquid which has been added to the sump of the dipping station at the time of passage of the $n^{th}$ animal. For shower dips, $V_R(n)$ should be evaluated immediately before the commencement of spraying of a batch. $V_R(n)$ for a continuous replenishment system, such as is the subject of this Appendix, is given by the equation $$V_R(n) = nV_A,$$

since the dipping liquid is continuously replenished to a predetermined level, in order to make up for the loss of dipwash ($V_R$) on each of the n animals.

$C_L$ represents the concentration of active ingredient in the initial charge, which for the above experimental configuration also equals the concentration of active ingredient in the replenishment charge.

$s(n)$ represents the stripping factor for the $n^{th}$ animal, which is defined by the equation $$s(n) = \frac{g(n)}{C(n)}$$

Consider now the changing condition of the sump between the passage of the $(n-b)^{th}$ sheep and the passage of the $n^{th}$ animal (where b is some small number so that n–b is close to n). The following statements can then be made:

1. The amount of grams of active ingredient delivered into the sump between the time of passage of the $(n-b)^{th}$ and the $n^{th}$ animal is $$bV_AC_L$$

since the total replenishment volume over this time is $bV_A$ and the replenishment concentration is $C_L$.

2. The amount of grams of active ingredient removed from the sump between the time of passage of the $(n-b)^{th}$ and $n^{th}$ animal is $$bV_Ag(n),$$

since the total dipwash volume removed by the b animal is $bV_A$ and the nominal concentration of active ingredient on each animal's surface is $g(n)$. It should be noted that $g(n)$ is presumed to be the same as $g(n-b)$.

3. From 1 and 2, the change (in grams) of active ingredient in the sump between the time of passage of the $(n-b)^{th}$ and $n^{th}$ animal is $$bV_A[C_L-g(n)]$$

4. Another expression for the change (in grams) of active ingredient in the sump between the time of passage of the $(n-b)^{th}$ and $n^{th}$ animal is given by $$[C(n)-C(n-b)]V_S,$$

since $V_S$ is the sump volume.

5. Equating the expressions in 3 and 4 gives $$bV_A[C_L-g(n)] = [C(n)-C(n-b)]V_S$$

6. Using the relation $s(n)=g(n)/C(n)$ to replace $g(n)$ in 5 gives (after some algebra)

$$s(n) = \frac{C_L}{C_n} + \frac{[C(n)-C(n-b)]V_S}{C(n)bV_A}$$

Clearly the limit (as n tends to infinity) of $s(n)=C_{IC}/C_{SS}=SF$. Thus for example from FIG. 2, setting n=100, b=100 we have $C_L$=100 mg/L
$C(n)=C(100)$=89.4 mg/L
$C(n-b)=C(0)$=99.2 mg/L
$V_S$=3364 L
$V_A$=2.3 L
whence
$s(100)$=2.74

From the same figure setting n=900, b=200 we have $C_L$=100 mg/L
$C(n)=C(900)$=34.8 mg/L
$C(n-b)=C(700)$=40.5 mg/L
$V_S$=3364 L
$V_A$=2.3 L
whence
$s(900)$=3.87

It will be noted that $s(n)$ shows some variation depending on which parts of the stripping curve are used for the evaluation.

The following procedure may also be used to increase the precision of the estimation the stripping factor SF.

(1c) A Curve-fitting Procedure to Establish a Specific Stripping Factor from an Experimental Stripping Curve The expression in point 6 above can be written in the form $$C(n) = \frac{V_A C_{IC} + C(n-1)V_S}{[V_S + V_A s(n)]} \cdot \frac{V_A C_{IC} + C(n-1)V_S}{V_S + V_A \cdot SF}$$

when b=1 and the stripping factor SF is used in place of $s(n)$.

If $V_A$, $C_{IC}$, $V_S$ and SF are fixed, then the above expression can be used to generate a postulated stripping curve $C(n)$, according to the following (programmable) algorithm.

Start with $C(1)=C_L=C_{IC}$
Write n–1=1 and use the expression and $C(1)$ to generate $C(2)$
Write n–1=2 and use the expression and $C(2)$ to generate $C(3)$ . . . .

The above algorithm can be continued up to any desired animal number n.

A different postulated stripping curve can be generated using a different choice of SF [with $V_A$, $C_L$, $V_S$ remaining the same].

That postulated curve with the closest fit to the experimentally determined stripping curve may then be used to obtain an estimate of the overall stripping factor. For example, using the stripping curve of FIG. 2 the step by step computations are:

Assume SF=3.5, and as before $V_A$=2.3 L/head
$V_S$=3364 L

Then $$C(1) = \frac{2.3*100 + 100*3364}{3364 + 2.3*3.5} = 99.83 \text{ mg/L}$$

C(n−1) becomes C(1)=99.83, and now $$C(2) = \frac{2.3*100 + 99.83*3364}{3364 + 2.3*3.5} = 99.66 \text{ mg/L}$$

C(n−1) becomes C(2)=99.66 and so on.

It is important to note that the experimental dipping curve should contain at least 1000 animals or sufficient animals to generate a stripping curve where near steady state is achieved.

The above shows how to calculate a stripping curve for a given value of SF. The next step of the procedure is to generate a family of stripping curves corresponding to a range of values of SF and to choose which of those values of SF most closely resembles (through minimum least squared differences) the empirical stripping curve.

Example 2

Determination of the Stripping Curve from FIG. 2

The observed data points shown in FIG. 2 were used in a least square curve fitting procedure for a family of curves characterised by:
$V_A$=2.3 L/hd
$C_L$=100 mg/L
$V_S$=3364 L
and various SF values.

Each individual curve was obtained by the method of Example 1(c)

Figure 7:
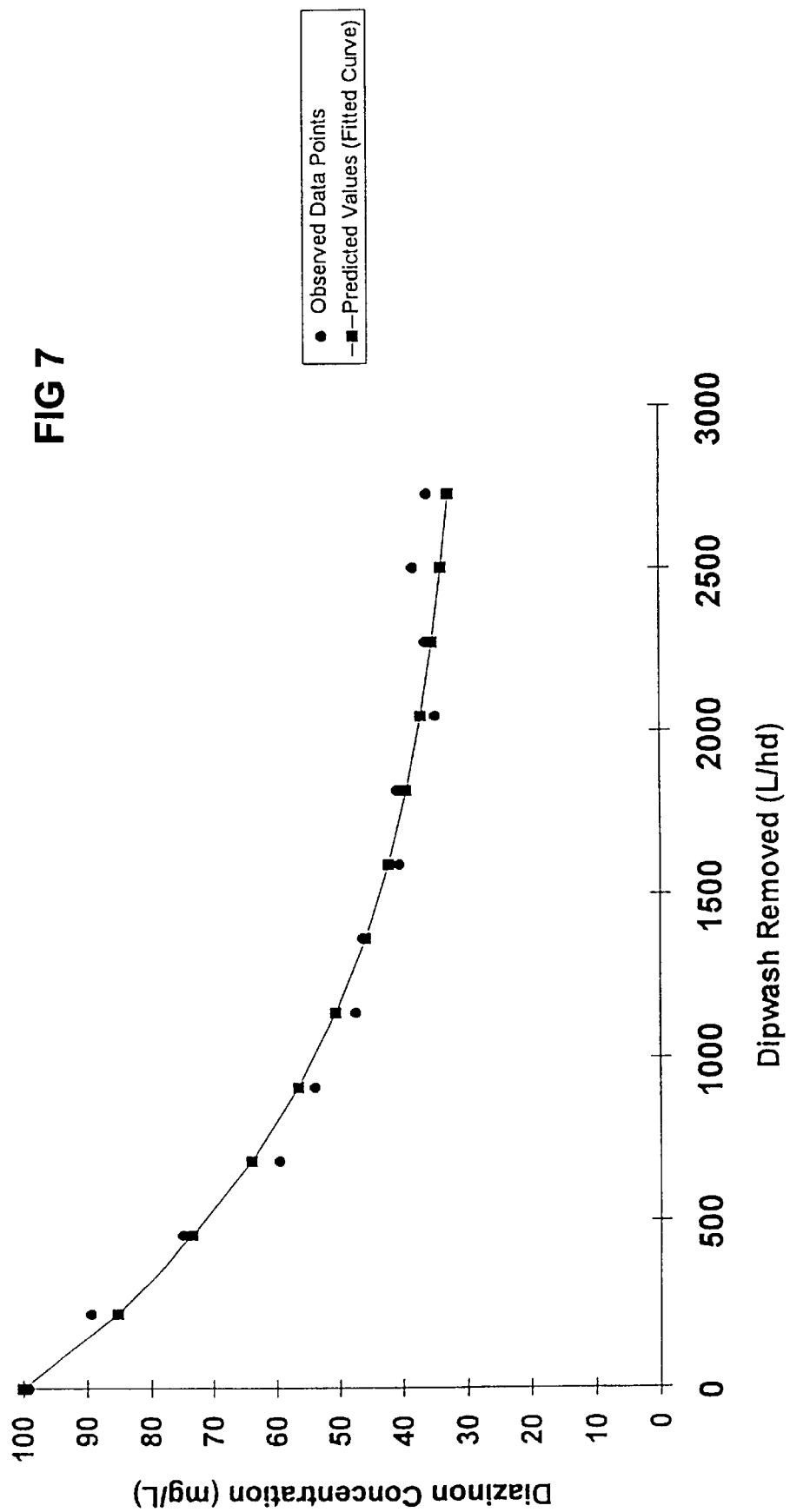
FIG. 7 is a graphic representation of a curve fitting procedure for data of FIG. 2 in accordance with one embodiment of the invention.

The sum of the squared difference was minimised at 99 which corresponded to an overall stripping factor of 3.5 (see Table 2). Analysis of variance between observed and expected values was significant (F=0.00038) and the correlation statistic was 0.99. A graphic representation of the curve fitting in FIG. 7.

TABLE 2

Observed and optimum calculated stripping curve for the data from FIG. 2 (SF = 3.5).

| Liters removed ($V_A$,L/hd) | Observed $C_n$ (mg/L) | Calculated $C_n$ (mg/L) | Difference Squared |
|---|---|---|---|
| 0 | 99.2 | 100 | 1 |
| 228 | 89.4 | 85 | 19 |
| 456 | 74.8 | 73 | 3 |
| 684 | 59.4 | 64 | 19 |
| 912 | 53.7 | 56 | 7 |
| 1140 | 47.4 | 50 | 9 |
| 1368 | 46.3 | 46 | 0 |
| 1596 | 40.5 | 42 | 3 |
| 1823 | 40.8 | 39 | 2 |
| 2051 | 34.8 | 37 | 5 |
| 2279 | 36.3 | 35 | 1 |
| 2507 | 38.2 | 34 | 19 |
| 2735 | 36.1 | 33 | 11 |
| Sum of Squared Differences | | | 99 |

The following examples show how the method of this specification can be used to achieve a more uniform exposure to pesticide of all animals dipped in other dipping contexts.

Example 3

Determination of the Stripping Curve from FIG. 3a

As a demonstration of the curve fitting procedure, the observed data points in FIG. 3a are used below. The input values were:

$V_A$=2.3 IL/hd
$C_L$=100 mg/L
$V_S$=840 L

Figure 8:
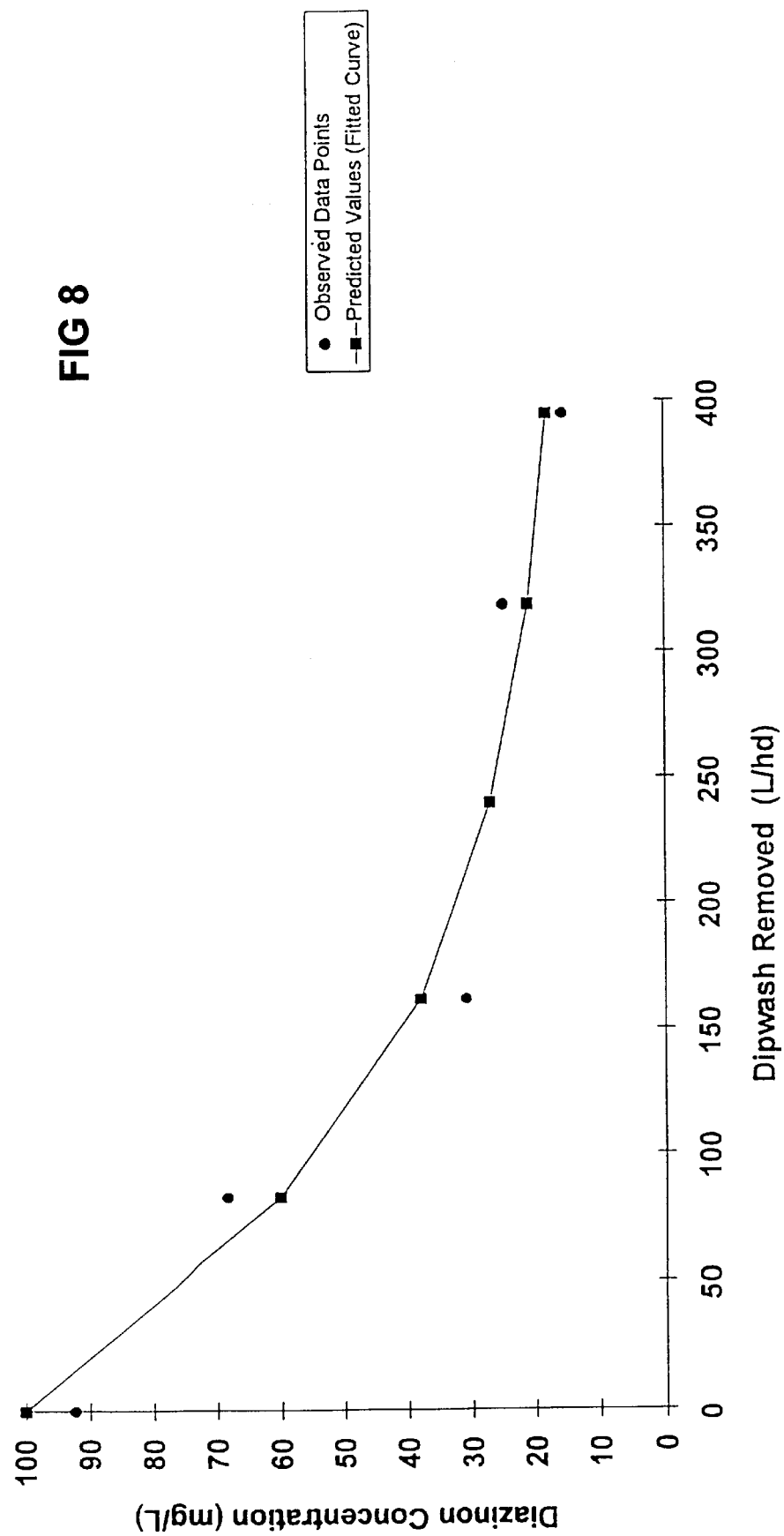
FIG. 8 is a graphic representation of a curve fitting procedure for data of FIG. 3a in accordance with another embodiment of the invention.

Again using the programmable algorithm in Example 1(c), values of SF were inserted until the sum of the squared differences were minimised between observed and computed stripping curves. Table 3 below shows data values for the optimum calculated curve. The sum of the squared difference was minimised at 206 which corresponded to an overall stripping factor of 6.8. Analysis of variance between observed and expected values was significant (F=0.003) and the correlation statistic was 0.98. A graphical representation of the fitted curve is shown in FIG. 8.

TABLE 3

Observed and computed values for stripping curves in which the sum of the squared difference is minimised for the Stripping Curve shown in FIG. 3(a).

| Liters removed ($V_A$,L/hd) | Observed $C_n$ (mg/L) | Calculated $C_n$ (mg/L) | Difference Squared |
|---|---|---|---|
| 0 | 92.3 | 100 | 59 |
| 83 | 68.2 | 60 | 73 |
| 162 | 30.9 | 38 | 56 |
| 240 | 26.9 | 27 | 0 |
| 319 | 24.9 | 21 | 13 |
| 395 | 15.5 | 18 | 7 |
| Sum of Squared Differences | | | 208 |

Example 4

Figure 9:
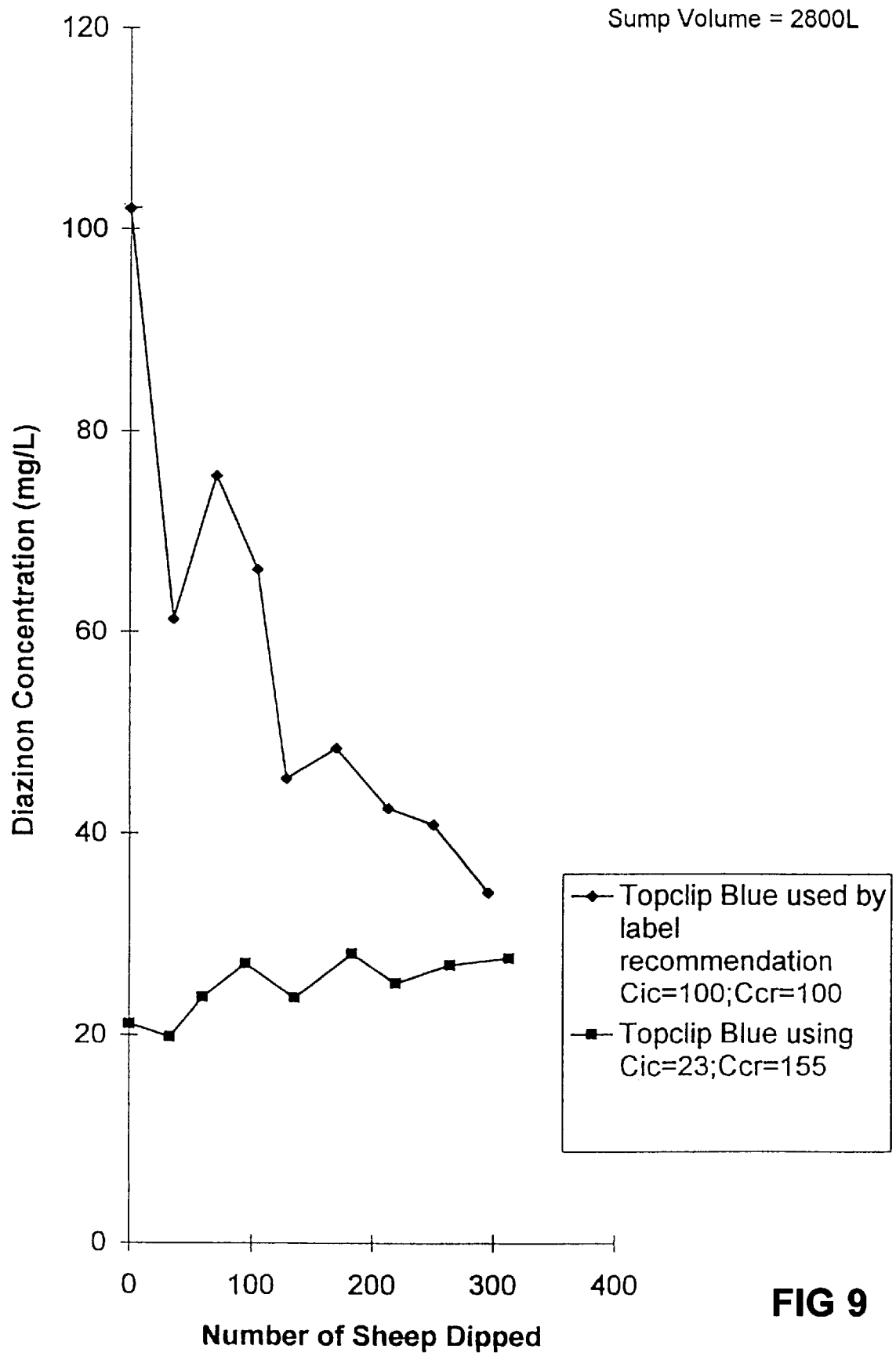
FIG. 9 is a graphic representation of a conventional stripping curve and a stripping curve produced in accordance with another embodiment of the invention.

Comparative Stripping Curves Using Established (Recommended) Dipping Practice and the Method of This Invention In this example, Topclip Blue was used to dip Merino wethers with 4 weeks wool according to the product label, ie. with an initial charge of concentration 100 mg/L. and a continuous replenishment charge of concentration 100 mg/L. The stripping curve was measured by progressive sampling and analysis of the concentration of active ingredient in the dipwash, and is shown as the upper curve in FIG. 9. Clearly the use of the product according to the label specification results in the delivery of a highly variable unit dose (with 3-fold variation) of insecticide to the sheep.

The stripping factor, SF, was calculated from the stripping curve by the methods described in Examples 1(c), 2 and 3. Clearly the formulation, in the given use context is a high-stripping formulation. For the above scenario, the product has a SF value of approximately 5.9. In this case $C_{IC}$=100 mg/L, $C_{CR}$=100 mg/L, SF is approximately equal to 5.9. Therefore the product of $C_{IC}$ times SF (590) divided by $C_{CR}$ is 5.9. This is well outside the range (0.2–2.0) included in this specification.

In a separate experiment, carried out according to this invention Topclip Blue was used to dip similar wethers in the same dipping station, according to the method of the present invention. The initial charge was 23 mg/L and using the formula $0.2<C_{IC}\cdot SF/C_{CR}<2.0$ the concentration of the replenishment charge was selected at 155 mg/L. The stripping curve was similarly measured and is shown as the lower curve in FIG. 9. Clearly a highly uniform unit animal dose was achieved. The product of the s value (5.9) and the concentration of active ingredient in the initial charge (23 mg/L) divided by the concentration of active ingredient in the replenishment charge 155 mg/L, lies well inside the range (0.2–2.0) of this specification. In both the above experiments, the liquid level in the sump was regulated by keeping the level up to a mark on the sump, ie. by maintaining the level at a fixed, predetermined height.

It is important to note from the above example that when dipping was carried out according to the method of the invention, the concentration of active ingredient in the sump was always close to 23 mg/L. This concentration is substantially lower than the label-recommended concentration of the initial charge (of 100 mg/L). This difference is a clear point of differentiation of the present invention from the prior art.

Most worker exposure to active ingredient occurs as a result of exposure to liquid from the sump. Clearly the risk of operator exposure is significantly diminished under recommendations of this invention, relative to the label method recommendations of the existing practices.

Example 5

Figure 10:
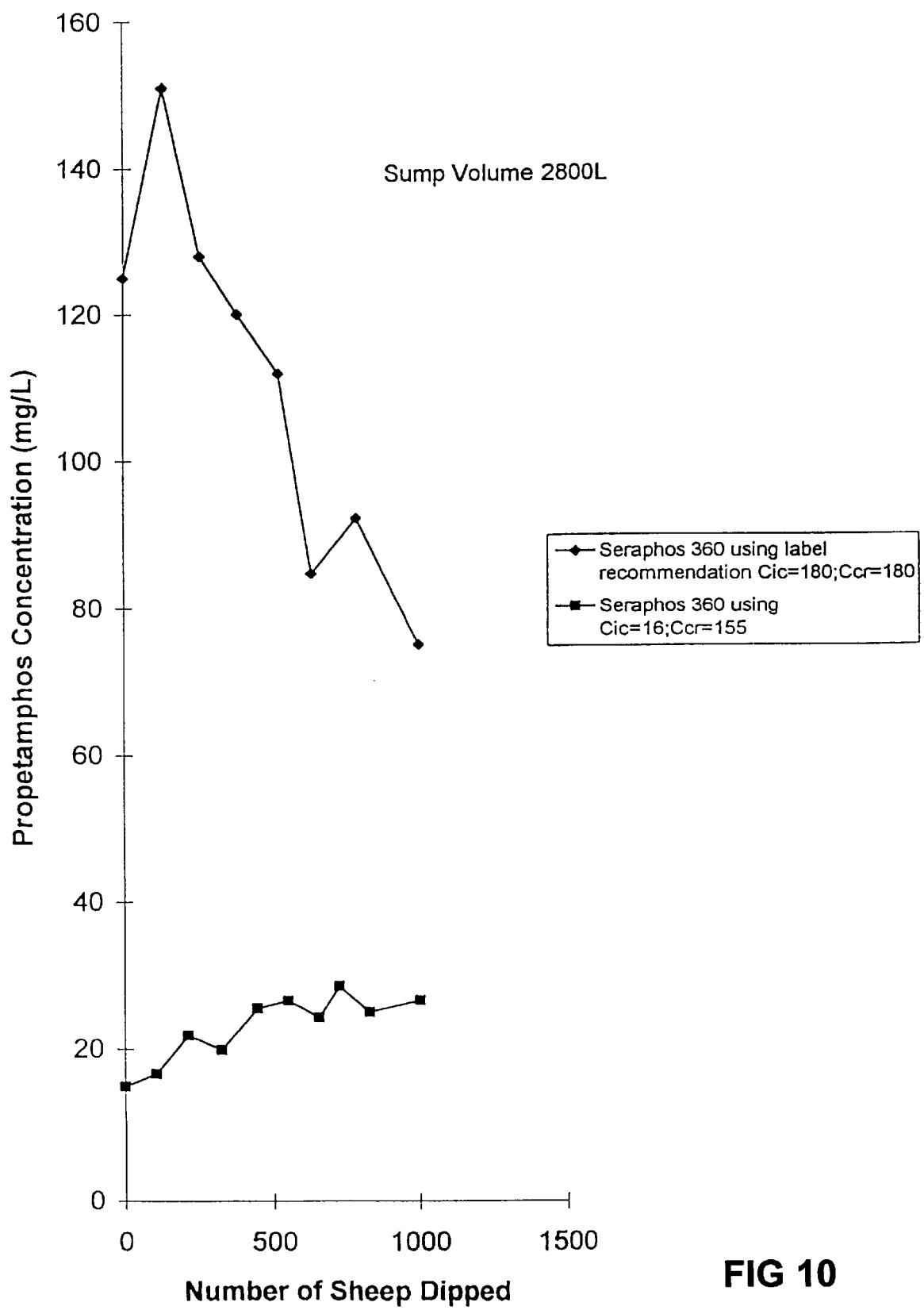
FIG. 10 is another graphic representation of a conventional stripping curve and a stripping curve produced in accordance with another embodiment of the invention.

A Further Example of Comparative Stripping Curves Using Established (Recommended) Dipping Practice and the Method of This Invention In a further demonstration of the problems associated with traditional dipping, using the same dipping equipment, Seraphos 360 (propetamphos 360 g/L) was used to dip Merino wethers with 4–5 weeks wool growth according to label recommendations (initial charge of 180 mg/L and continuous replenishment charge of 180 mg/L). The stripping curve was measured by progressive sampling of dipwash and analysis of active ingredient concentration, and is shown as the upper curve in FIG. 10. Clearly, recommended use of the Seraphos 360 resulted in delivery of variable dose between animals within the dipped group, with greater than 3 fold variation of insecticide exposure to the sheep, the stripping coefficient, SF was calculated in accordance with the preferred embodiment of the invention according to the methods described in Examples 1(b) 2 and 3, and was found to take the value 4.3. For the above scenario, the ratio $C_{IC}*SF/C_{CR}$ equals 4.3, which is well outside the range (0.2–2.0) specified for this invention.

In a separate experiment, Seraphos 360 was used to dip similar wethers in the same dipping station, however an initial charge concentration of 16 mg/L and a continuous replenishment charge concentration of 155 mg/L were used. The stripping curve was similarly measured and is shown as the lower curve in FIG. 10. Clearly a more uniform unit animal dose was achieved and the ratio $C_{IC}*SF/C_{CR}$ was 0.44; which is inside the desired range (0.2–2.0) for this invention. When traditional dipping practices were employed, the $C_{IC}*SF/C_{CR}$ value as previously noted would be 4.3.

In both the above experiments, the liquid level in the sump was regulated by keeping the level up to a mark on the sump, i.e.: using a simple height denominated stratagem.

Two further examples, each at separate locations (different farming properties), demonstrate that this invention with other types of sheep and different types of dipping equipment.

Example 6

Figure 11:
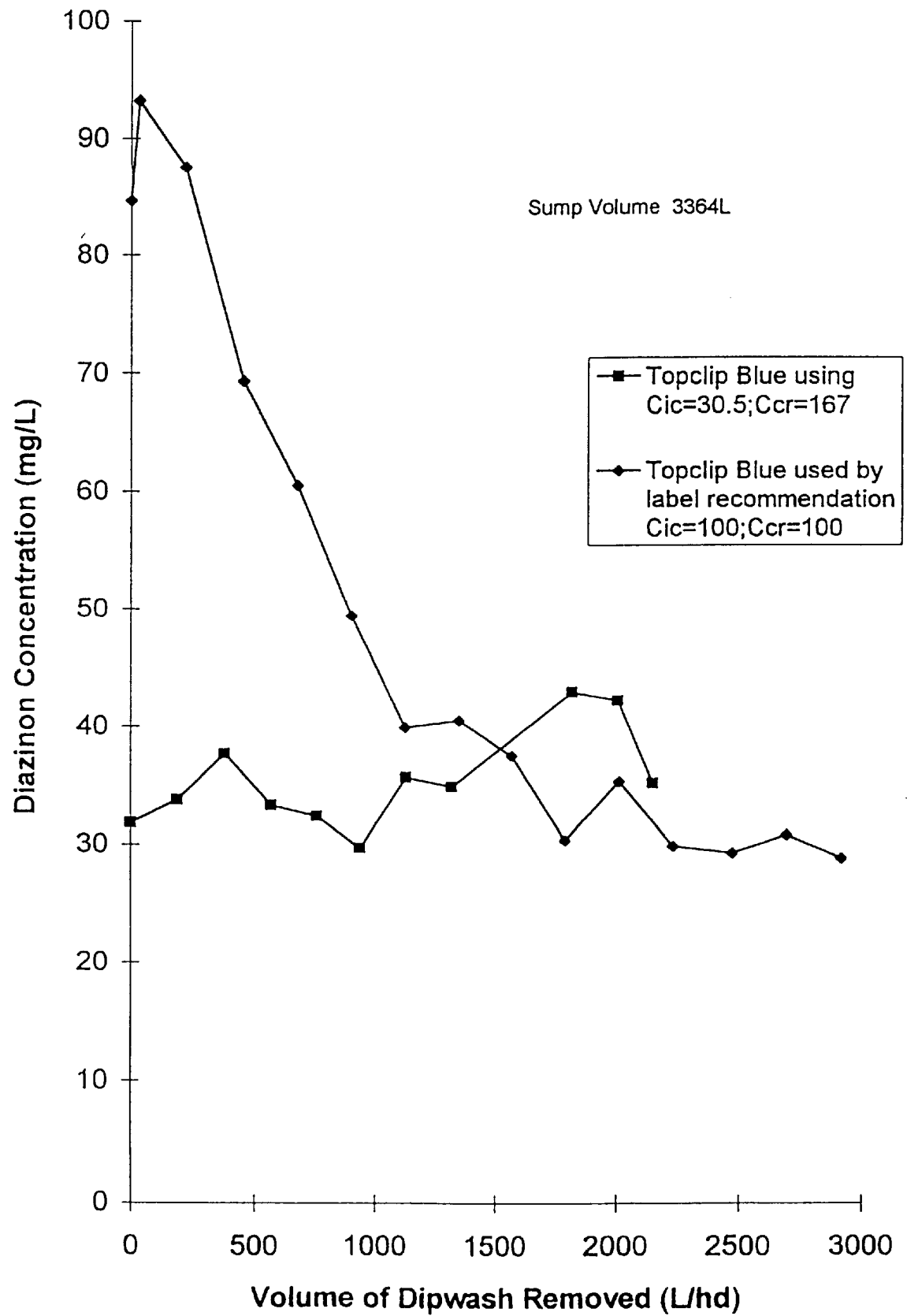
FIG. 11 is another graphic representation of a conventional curve and a stripping curve produced in accordance with another embodiment of the invention.

A Further Example of Comparative Stripping Curves Using Traditional Dipping Practices and the Method of This Invention As a third example of the invention, Topclip Blue was used in an in-ground plunge dip of 3364 L capacity to dip adult Merino sheep with 4 weeks wool. Dipping was conducted according to the product label, with an initial charge concentration of 100 m/L. and a replenishment charge concentration of 100 mg/L. The stripping curve was measured and is shown in as the upper curve in FIG. 11. Clearly the use of the product according to the product label specification resulted in a highly variable exposure of the sheep to insecticide (3 fold variation). The stripping factor was calculated according to the methods described in Example 1(c), 2 and 3 and found to be 3.3. For the above scenario the ratio $C_{IC}*SF/C_{CR}$ was 3.3, which is well outside the range (0.2–2.0) of this specification.

In a separate experiment, Topclip Blue was used to dip adult Merino sheep of varying wool length (4 weeks to 4.5 months wool) in the same dipping station, however with an initial charge concentration of 30.5 mg/L and a continuous replenishment charge concentration of 167 mg/L (allowing an estimated SF of 5.5 ). The actual stripping curve is shown as the lower curve of FIG. 11. A highly uniform unit animal dose was achieved, and the ratio $C_{IC}*SF/C_{CR}$ was 0.87 (the actual SF equalled 4.8). This value was well inside the range (0.2–2.0) of this specification. In both the above experiments, the liquid level in the sump was regulated by keeping the level up to a mark on the sump, i.e.: again, a simple fluid depth denominated stratagem was used.

Example 7

Figure 12:
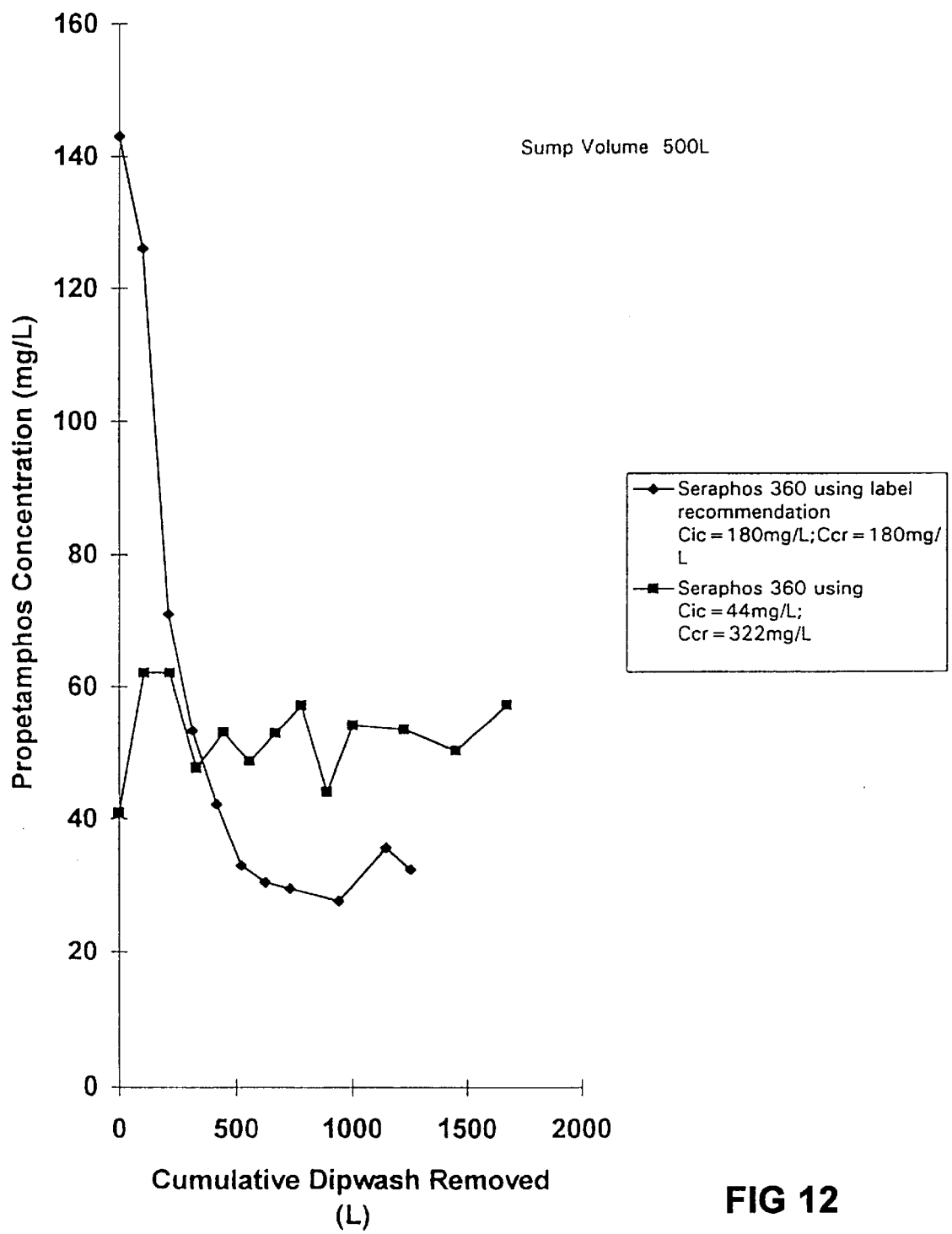
FIG. 12 is another graphic representation of a conventional curve and a stripping curve produced in accordance with another embodiment of the invention.

A Further Example of Comparative Stripping Curves Using Established (Recommended) Dipping Practices and the Method of this Invention In a final example of the invention, Seraphos 360 (Propetamphos 360 g/L) as used in a shower dip (Buzzacott) with a sump of 500 L capacity to dip adult Merino sheep with 3–4 weeks wool, according to the product label (initial charge 180 m/L, replenishment charge 180 mg/L). The stripping curve was determined as the upper curve in FIG. 12. Again, use of the product according to the product label resulted in highly variable exposure of the animals to insecticide (5 fold variation). The SF value was calculated according to the methods described in Examples 1 (b), 2 and 3.

For the above scenario the ration $C_{IC}*SF/C_{CR}$ equalled 6.7, which is well outside the range of this specification (0.2–2.0).

In a separate experiment, Seraphos 360 was used to dip similar adult sheep in the same dipping station, however an initial charge of 44 mg/L and a continuous replenishment charge of 322 mg/L was used. The stripping curve was measured and is shown as the lower curve of FIG. 12. Highly uniform exposure was achieved and the ratio $C_{IC}*SF/C_{CR}$ was 1.18, which is inside the range (0.2–2.0) of this specification.

In both the above experiments, the liquid level in the sump was regulated by keeping the level up to a mark on the sump prior to the commencement of dipping each batch, i.e.: by a simple height denominated stratagem.

Examples 6 and 7 show how dipping by the method of this invention, a low initial charge can be employed and a more consistent concentration of active ingredient in the dip (and consequently on the dipped animals) can be achieved. The dip concentrations can be related to, and maintained above a concentration that delivers the minimum effective pesticidal dose (MED) on the dipped animals using a simple, fluid height denominated, continuous replenishment system.

Conversely, use of pesticides according to conventional practices (as exemplified by their current label instructions, FIGS. 3 and 4) would have resulted in the pesticide concentrations falling to ineffective levels during the dipping process, whilst a significant number (10–20%) of other animals dipped were exposed to 3 to 5 times the required (minimum effective) concentration of pesticide.

Finally, it is to be understood that various other modifications and/or alterations may be made to the dipping processes, or pesticides and/or active ingredients employed, without departing from the spirit of the present invention as outlined herein.

What is claimed is:

1. A method of dipping a number of animals of a species with a pesticide using a formulation of the pesticide which is subject to stripping of the pesticide during dipping of successive animals or groups of animals, the method including:

establishing a predetermined level of a dipping liquid containing a first concentration of the pesticide ($C_{IC}$) in a dipping vessel said concentration providing safe and effective pesticidal treatment;

dipping the animals in the dipping liquid; and maintaining the predetermined level of the dipping liquid in the dipping vessel by addition thereto of a replenishment composition containing a second concentration of the pesticide the second concentration of the pesticide ($C_{CR}$) being greater than the first concentration of the pesticide, to thereby maintain a safe and pesticidally effective concentration of the pesticide.

2. A method of dipping according to claim 1, wherein said second and said first concentration comply with the relationship wherein the first concentration of the pesticide ($C_{IC}$) times the Stripping Factor (SF), divided by the second concentration of the pesticide ($C_{CR}$) lies within the range of from 0.2 to 2.0 and wherein the stripping factor (SF) is at least two and is defined according to the relationship:

$$SF = \frac{C_{IC}}{C_{SS}}$$

wherein $C_{SS}$ is a steady state concentration provided when animals are dipped in a dipping liquid of said first concentration contained in the vessel and the level in the vessel is maintained during dipping by replenishment of the liquid removed with a dipping liquid of concentration equal to the first concentration, the concentration of pesticide in the vessel being initially reduced as a result of stripping of pesticide until said steady state concentration is reached and from which no significant further reduction in concentration occurs.

3. A method of dipping according to claim 1, wherein said second and said first concentration comply with the relationship wherein the first concentration ($C_{IC}$) times the Stripping Factor (SF), divided by the second concentration ($C_{CR}$) lies within the range of from 0.2 to 2.0 and wherein the stripping factor (SF) is at least two and is determined by a curve fitting procedure comprising:

(i) dipping a number of animals in a dipping liquid of the first concentration ($C_{IC}$) contained in the vessel and maintaining the level of liquid in the vessel during dipping by replenishment of the liquid removed with a dipping liquid of the first concentration ($C_{IC}$);

(ii) preparing a graph of concentration of pesticide against numbers of animals;

(iii) generating an array of calculated stripping curves showing the change in concentration of pesticide during dipping for a range of SF values using the formula $$(C_n) = \frac{V_A C_{IC} + C_{n-1} V_S}{V_S + V_A SF}$$

wherein $V_s$ is the volume of dipping liquid $V_A$ is the average volume of dipwash removed per animal $C_n$ is the concentration after passage of the animal $C_{IC}$ is the first concentration and equals the replenishment concentration in the procedure; and (iv) fitting the graph determined in step (i) with the array of calculated stripping curves to determine the stripping factor corresponding to the closest fitting calculated stripping curve.

4. A method according to claim 1 wherein the second concentration is at least twice the first concentration.

5. A method according to claim 2 of claim 3 wherein the stripping factor is in the range of from 2 to 50.

6. A method according to claim 2 or claim 3 wherein the stripping factor is in the range of from 2 to 20.

7. A method according to claim 2 or claim 3 wherein the level of dipping liquid is maintained with no greater than 10% variation from the initial level.

8. A method according to claim 2 or claim 3 wherein the level of liquid is maintained by level control means adapted to provide flow of replenishment composition into the vessel in response to a reduction from the predetermined level.

9. A method according to claim 2 or claim 3 wherein in the step of dipping the animals, the animals are immersed in the dipping liquid contained within the vessel.

10. A method according to claim 2 or claim 3 wherein the pesticide is selected from organophosphates, carbamates, formamidines, pyrethroids, macrocyclic lactones and insect growth regulators including the benzoyl phenyl ureas.

11. A method according to claim 9 wherein the pesticide is selected from the group consisting of organophosphates formamidines and macrocyclic lactones.

12. A method according to claim 9 wherein the pesticides is selected from the group consisting of diazinon, amitraz and propetamphos.

13. A method according to claim 9 wherein the pesticide is Diazinon and the first concentration is in the range of from 10 to 60 mg per liter.

14. A method according to claim 2 or claim 3 wherein at least 50 sheep are dipped in succession.

15. A method according to claim 1 wherein the replenishment composition is contained in a replenishment vessel provided with means for transferring liquid from the replenishment vessel to the dipping vessel in response to a drop in level of dipping liquid in the dipping vessel.

16. A dipping system according to claim 15 wherein the means for transferring liquid from the replenishment tank includes a ball float valve responsive to a drop in the limit of liquid in the dipping vessel of no more than 10%.

* * * * *